US006757342B1

(12) United States Patent
Nakamura et al.

(10) Patent No.: US 6,757,342 B1
(45) Date of Patent: Jun. 29, 2004

(54) DATA DEMODULATION

(75) Inventors: Hiroshi Nakamura, Nagano (JP);
Mitsuo Yokozawa, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/538,180

(22) Filed: Mar. 30, 2000

(30) Foreign Application Priority Data

| Mar. 30, 1999 | (JP) | 11-088048 |
| Apr. 5, 1999 | (JP) | 11-097615 |
| Apr. 13, 1999 | (JP) | 11-105065 |

(51) Int. Cl.[7] ............................. H03D 3/00; H04L 27/14
(52) U.S. Cl. .................. 375/334; 375/372; 375/342; 341/71
(58) Field of Search ................... 375/242, 243, 375/272, 334, 317, 340, 342; 327/58; 341/71, 132; 360/2, 51, 53

(56) References Cited

U.S. PATENT DOCUMENTS

| 4,551,846 A | 11/1985 | Takeda et al. |
| 5,034,940 A * | 7/1991 | Saito et al. ............... 369/44.34 |
| 5,285,328 A | 2/1994 | Behr et al. |
| 5,298,897 A * | 3/1994 | Harrison et al. ............... 341/71 |
| 5,379,037 A | 1/1995 | Harrison et al. |
| 5,670,951 A * | 9/1997 | Servilio et al. ............. 375/287 |
| 6,233,107 B1 * | 5/2001 | Minuhin ....................... 360/51 |
| 6,377,633 B1 * | 4/2002 | Schneider ................... 375/317 |

FOREIGN PATENT DOCUMENTS

| JP | 9023248 | 1/1997 |

OTHER PUBLICATIONS

International Standard ISO/IEC 7811–2, Identification Cards—Recording Technique—Part 2 Magnetic Stripe.
*English Abstract of JP 9023248.

* cited by examiner

*Primary Examiner*—Phoung Phu
(74) *Attorney, Agent, or Firm*—Reed Smith LLP

(57) ABSTRACT

A data demodulating technique for binary data defined by a pulse code modulated signal. The technique involves digitizing the data signal read by a magnetic head from the stripe of a magnetic card. The time interval between peaks in the digitized signal is determined to provide peak interval values. The peak interval values form the basis for determining the end of a character and also by a pattern matching technique against idealized data form the basis for determining the character itself.

17 Claims, 18 Drawing Sheets

| Segment | Peak interval Value | Bit conversion | Pattern matching | Correlation coefficient |
|---|---|---|---|---|
| Sg1 | 33,32,64,65,34,30,32,32 | 19H | - | - |
| Sg2 | 63,62,33,30,34,31,34,31 | 1CH | - | - |
| Sg3 | 33,33,65,64,62,62 | 01H | - | - |
| Sg4 | 33,31,24,23,23,63,64,65 | 07H | 01H | 0.888 |
| Sg5 | 60,61,34,33,65,65 | 04H | - | - |
| Sg6 | 66,63,64,59,35,28 | 10H | - | - |
| Sg7 | 35,31,65,62,66,59 | 01H | - | - |

| peak interval data | 32 | 33 | 51 | 23 | 29 | 34 | 54 | 74 | ~ |

| Character candidate obtained by bit conversion C = | Character code | Correlation coefficient obtained by pattern matching | Top four results of pattern matching D = | Result for this segment C&D = |
|---|---|---|---|---|
| 01H | 10H | -0.300 | 07H | 01H |
| 07H | 01H | 0.685 | 01H | 07H |
| 0BH | 02H | 0.261 | 1FH | |
| 0DH | 13H | 0.115 | 04H | |
| | 04H | 0.463 | | |
| | 15H | -0.071 | | |
| | 16H | -0.464 | | |
| | 07H | 0.819 | | |
| | 08H | -0.002 | | |
| | 19H | 0.357 | | |
| | 1AH | -0.035 | | |
| | 0BH | 0.390 | | |
| | 1CH | 0.152 | | |
| | 0DH | 0.204 | | |
| | 0EH | -0.188 | | |
| | 1FH | 0.508 | | |

DATA DEMODULATION

BACKGROUND OF THE INVENTION

The present invention relates to a technique for demodulating data signals recorded on, for example, magnetic cards, and more specifically relates to a highly reliable data demodulation technique for binary data recorded by a pulse code modulating method in which data is recorded by a combination of two types of pulses, F and 2F.

General recording and reproducing devices such as magnetic card readers use a modulation method by which binary data signal are identified by one of two types of pulses, F and 2F. Binary data recorded by this modulation technique is reproduced in the following manner.

A magnetic head and a magnetic stripe on a magnetic card are moved relative to one another to reproduce the magnetically recorded data in the form of an analog signal. Based on the signal waveform of the analog signal, the binary data is determined. FIG. 10 illustrates a general functional block diagram of a conventional data demodulation of this kind and FIG. 11 shows a signal waveform for each block. The recorded signal reproduction at FIG. 11a illustrates the pulse code modulation which under the Japanese Industrial Standard (JIS) is labeled: F and 2F frequency modulation.

In FIG. 10, an output signal of the magnetic head 11, which is obtained when a magnetic card 10 moves relative to the magnetic head, is amplified by two amplifiers 12 and 15. An output signal of the amplifier 12 is supplied to a peak detecting circuit 13 for peak detection, and a peak detection signal of the peak detecting circuit 13 is compared to zero level by a comparator 14 to detect zero crossing points thereof. An output signal of the other amplifier 15 is compared to zero level by a comparator 16 to detect zero crossing points thereof, and its output is input to a timing generation circuit 17. The timing generation circuit 17 changes the output level of the comparator 16 according to the level of the output signal of the comparator 16 which is observed at changing positions of the output signal of the comparator 14. The output signal of the timing generation circuit 17 is input to a data discriminating circuit or CPU 18 for a predetermined signal process to identify the character.

A magnetic stripe of a general magnetic card has not only a significant data region in which a recorded data is substantially stored, but also a sync bit region that comes before the significant data region, an STX code region that indicates the beginning of the recorded data, an ETX code region that comes after the significant data region and indicates the end of the data, LRC code region, and a sync bit region.

The operation of the functional block diagram illustrated in FIG. 10 will be described more specifically referring to FIG. 11 as well. FIG. 11(a) illustrates an example of a signal recorded on the magnetic card 10. The recorded signal is a binary data signal composed of a combination of two kinds of frequencies, F and 2F, and expresses the bit by "0" or "1" according to the existence of inversion of signal polarity within a time interval (distance) T equal to one bit. The example of FIG. 11(a) expresses "01101". FIG. 11(b) shows an example of the recorded signal of FIG. 11(a) which is read by the magnetic head 11 and amplified by the amplifiers 12 and 15. The output frequency of the amplifier 12 and 15 which corresponds to the recorded signal "1" is twice as long as that which corresponds to the recorded signal "0".

The peak detecting circuit 13 is composed of a differentiating circuit. Therefore, the peak detection output provides a signal waveform in which the zero crossing points appear at the peak positions of the output signal of the amplifier 12, as illustrated in FIG. 11(c). This signal is compared to zero level by the comparator 14 and converted to a digital signal which inverts at the zero crossing positions in the peak detection waveform as illustrated in FIG. 11(d). The output waveform of the amplifier 15 is compared to zero level by the comparator 16 and converted to a digital signal which inverts at the zero crossing positions thereof, as illustrated in FIG. 11(e). The timing generation circuit 17 outputs the signal as illustrated in FIG. 11(f). In other words, the timing generation circuit 17 changes the output level of the comparator 16 according to the level of the output signal of the comparator 16 which is observed the comparator 16 at changing positions of the output signal of the comparator 14. The signal illustrated in FIG. 11(f) is the same digital signal expressing "01101" as the signal of FIG. 11(a). Thus, it is understood that the data signal recorded on the magnetic card is demodulated.

Problems To Be Solved

The above mentioned performance of reading data recorded on magnetic cards is affected by the condition of card, contamination and wear of the magnetic head, electric noise or mechanical noise from a motor, etc. In other words, a recording medium such as magnetic cards receives various stresses over repetitive use; as a result, the contamination or scratches on the recording medium may cause signals that originally did not exist. Also, basic information once written on the recording medium will not be overwritten even with repetitive use; over the time that the recording medium makes repeated contacts with the magnetic head, the magnetic force decreases, and therefore signal intensity necessary for reproduction becomes insufficient, degrading accuracy of data reading. Further, the resolution power of the magnetic head is decreased due to wear on the magnetic head, causing peak shift.

If error occurs in reading data as above, the performance of reading data recorded on the medium may be degraded, affecting correct data identification. FIG. 4 illustrates an example of a false reading caused by peak shift. In FIG. 4, the correct binary data constituting one character is "1011101" where the second bit within the character time interval is originally "0". However, the length of the second bit within the character time interval, which is currently under decoding, is narrower than the original distance between peaks due to peak shift. Consequently, when this second bit is demodulated by a conventional method illustrated in FIG. 10 and FIG. 11, it is falsely decoded as "1" and accordingly the bit line is falsely determined as "1111111". In addition, the boundaries between the bits after the third bit are shifted due to peak shift, affecting the successive character interval (distance) and causing a false reading therein.

FIG. 14 illustrates another example of the waveform that contains peaks which originally do not appear or do not appear at expected positions. In this waveform, only one peak should appear between the second bit and third bit; although the original is "10011", three peaks are generated between the two bits for some reasons. If this waveform is demodulated by a conventional method shown in FIG. 10 and FIG. 11, the bit line will be falsely read as "11111".

In the aforementioned FM modulating method, as illustrated in FIG. 3, a constant reference time $\alpha T$ (where $0 \leq \alpha \leq 1$) is set with respect to a time interval (distance) T for one bit, and "0" or "1" is allocated to the bit by observing polarity inversion in the read signal within the reference time $\alpha T$. In other words, if there is no polarity inversion within the reference time αT, the bit is defined as "0" by the frequency F; if there is a polarity inversion within the reference time αT, the bit is defined as "1" by the frequency 2F. With this, false reading caused by peak shift can be prevented to some extent.

However, like the example of FIG. 3, even if the reference time αT is set and the bit is identified by observing polarity inversion of the read signal within the reference time αT, the aforementioned factors may cause a false reading; even when a false reading occurs in only one bit in the bit line, the false reading affects the successive bits in the bit line, resulting in false identification. In other words, according to the above described conventional data demodulating method, the predetermined reference time is given to each bit to determine the binary data for each bit; therefore, if error occurs in identification in even one bit, the error also affects the successive bits.

OBJECTS OF THE INVENTION

An object of the present invention is to provide a reliable data demodulating method, in which, for identifying the binary data of each bit, the character time interval (distance) for one character is segmented by a reasonable method, and the element of the character time interval (distance) for one character is used to greatly reduce false readings.

Another object of the present invention is to provide a data demodulating method in which, even when peaks that originally do not exist appear or do not appear at expected positions, false reading can be reduced to a great extent, making a highly accurate data demodulation possible.

An object of the present invention is to provide a data demodulating method by which the result of bit conversion is observed to ensure reliability thereof to take the next step; thus, false readings can be greatly reduced, providing a highly reliably data demodulation.

Another object of the present invention is to provide a data demodulating method by which, even if the character expressed by the segment could not be positively determined by bit conversion, the candidates of the characters are narrowed down, thus improving data reading performance.

DESCRIPTION OF THE PREFERRED EMBODIMENTS

A First Embodiment

Figure 1:
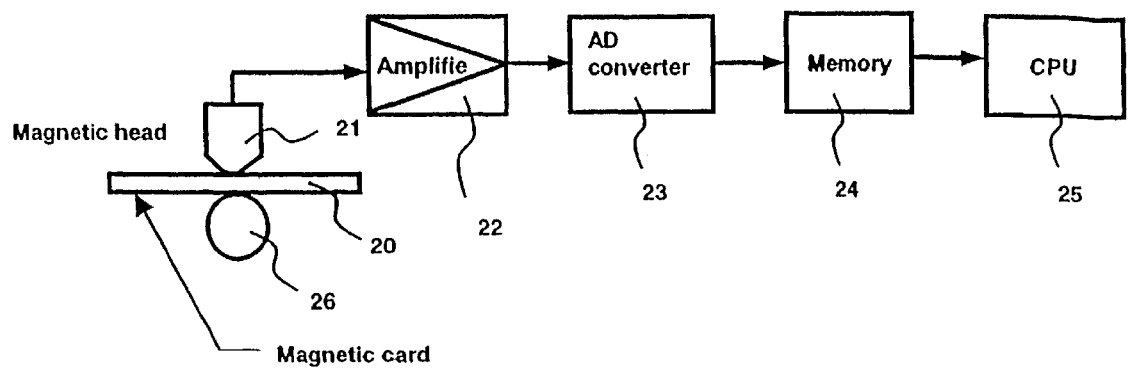
FIG. 1 is a functional block diagram of an embodiment of a data demodulating method of the present invention.

First Embodiment of a data demodulating method of the present invention is described referring to FIG. 1 through FIG. 9. FIG. 1 illustrates a functional block diagram of an example of hardware to operate the method of the present invention. In FIG. 1, on a magnetic stripe of magnetic recording medium, i.e., magnetic card 20, binary data composed of a pulse code modulated signal made up of a combination of high and low frequencies, F and 2F. The data for one character is made up of a predetermined number of bits and a parity bit; the data for a plurality of characters is recorded. FIG. 1 shows an example of reproduction of recorded data from the magnetic card 20; when the magnetic card 20 is inserted to a recording/reproducing device, a transport roller 26 is driven by a motor (not shown), and transports the magnetic card 20 while making a magnetic stripe on the magnetic card 20 contact with a magnetic head 21 which reads data signal recorded on the magnetic stripe.

An output signal of the magnetic head 21 is amplified to the required signal intensity by an amplifier 22, sampled and converted to a digital signal by an A/D converter 23, and stored in a buffer memory 24. The data stored in the buffer memory 24 is read by CPU 25 for demodulating operation. The demodulating operation by CPU 25 will be described next.

Figure 2:
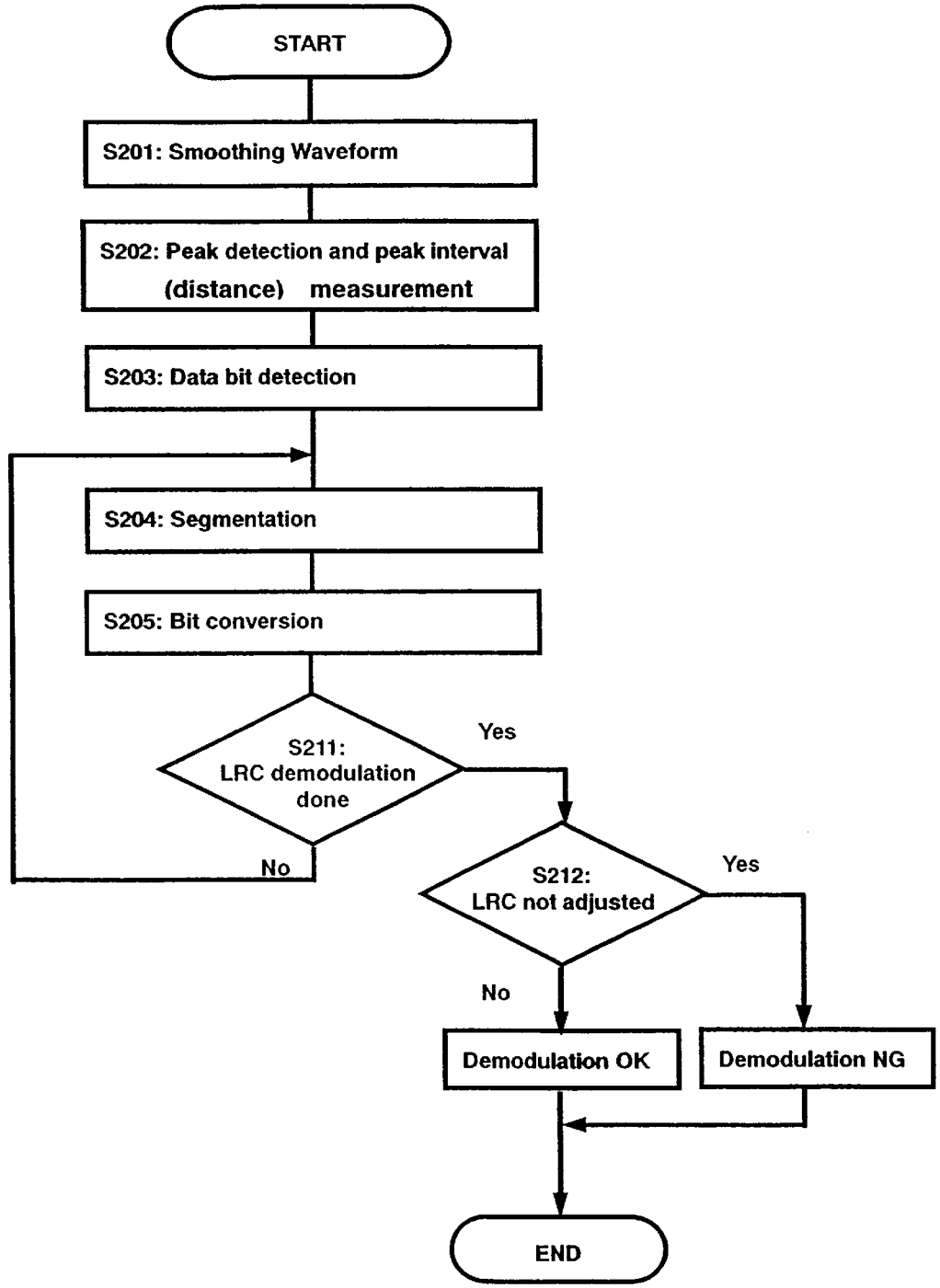
FIG. 2 is a flowchart of a data demodulating operation in the embodiment of FIG. 1.

As shown in FIG. 2, the waveform is smoothed to remove spike noise in step 201 (hereinafter, step will be denoted as "S201", "S202" . . . ). In S202, peaks are detected successively, and the time interval (distance) is measured between the newly detected peak and the previous peak. In S203, data bits are detected. The data bit detection can be performed by detecting the data indicating the beginning of the recorded data.

The above steps are carried out until a Longitudinal Redundancy Check (LRC) is detected. In other words, the steps are repeated over the entire length of the magnetic stripe of the magnetic card to generate the peak interval (distance) data line.

Figure 5:
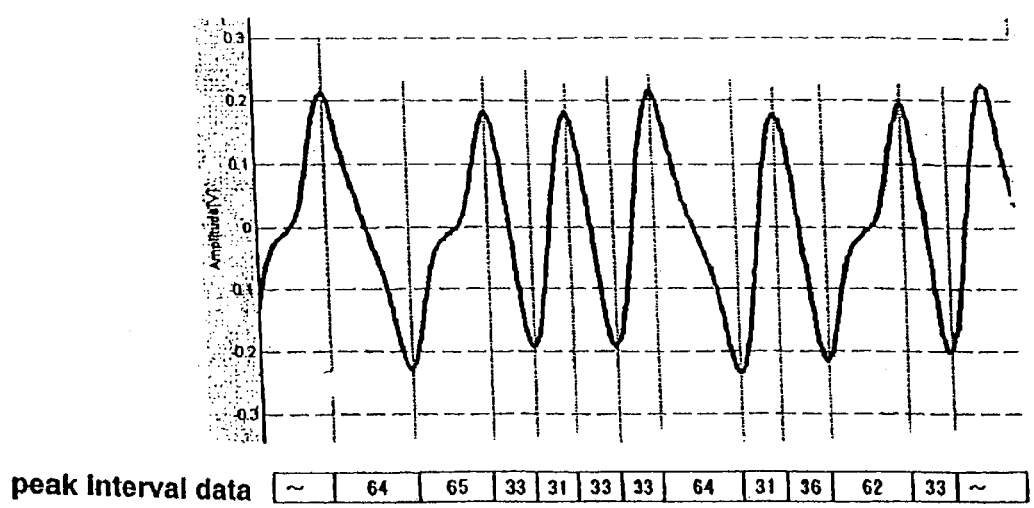
FIG. 5 is a waveform showing an example of peak interval (distance) data line in the data demodulation.

FIG. 5 illustrates an example of a read waveform and an example of the peak interval (distance) data line (peak interval (distance) value line) of the waveform. By the standard of the International Standardization Organization (ISO, for example, the magnetic card has the first and third tracks having recording density of 210 BPI; if the card transporting speed is 190 mm/s, the time equal to one bit is 636.6 $\mu$s. If the sampling rate for A/D converting analog waveform is 10 $\mu$s, the logic value of data points included in one bit is 63.7. In the example of FIG. 5, the peak interval (distance) data line is as "64", "65", "33", "31", "33" . . . .

Figure 7:
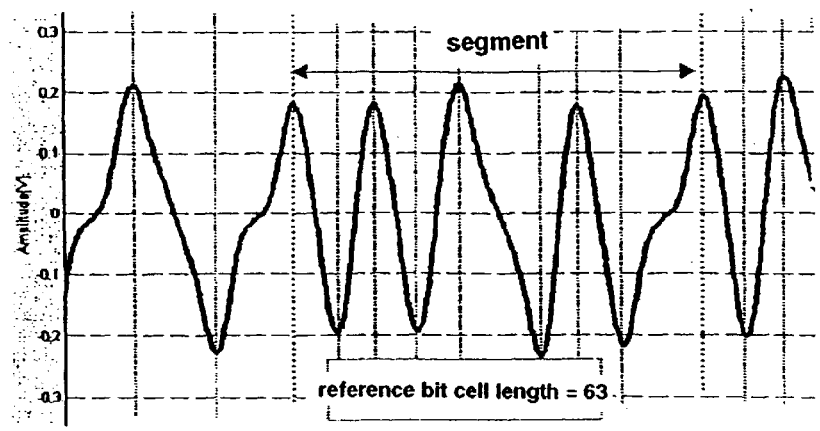
FIG. 7 is a waveform showing an example of the segmentation of FIG. 6.

Segmentation is performed based on the peak interval (distance) data line. Segmentation means that the reproduced waveform data is divided into segments, each of which corresponds to a character (See S204 in FIG. 2). A specific example of steps of the segmentation will be described referring to FIG. 7. The waveform illustrated in FIG. 7 is of the third track by ISO standard. The ISO third track expresses one character with total five bits made up of four data bits and one parity bit. Because of odd parity, the number of "0" bits is always even. Therefore, the number of the peak interval (distance) values that constitutes a segment is limited to six, eight, or ten.

When the number of the peak interval (distance) values is six, the segment corresponds to a character code consisting of four "0" bits and one "1" bit. When the number of the peak interval (distance) values is eight, the segment corresponds to a character code consisting of two "0" bits and three "1" bits; when ten, all the five bits represent "1" for a character code. The waveform illustrated in FIG. 7 is the one described in FIG. 6, and accordingly the peak interval (distance) data line is the same. Suppose that a target segment starts at the third value in the peak interval (distance) data line: when the number of the peak interval (distance) values is eight in this example, the total of the six peak interval (distance) values is 225; when eight, the total of the eight peak interval (distance) values is 323; when ten, the total of the ten peak interval (distance) data is 388.

Figure 6:
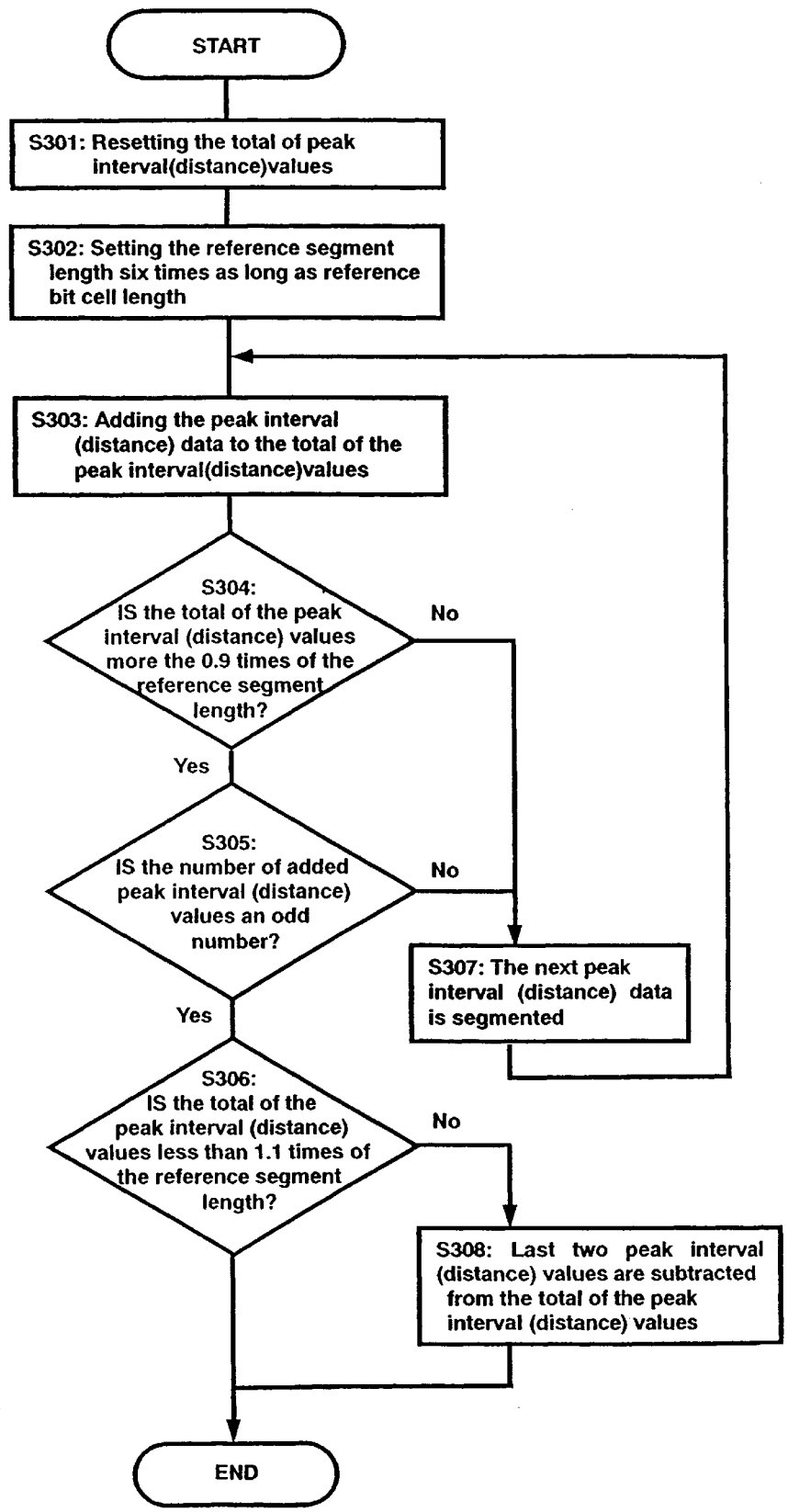
FIG. 6 is a flowchart of an example of segmentation of one character in the present invention.

FIG. 6 describes an example of the above segmentation. First, the total of the peak interval (distance) values is reset to zero (S301). Next, a reference segment length is set in S302. Since one character of the recorded data is expressed with five bits as described above, the reference segment length is set five times longer than a reference bit cell length. The reference bit cell length is obtained by measuring the waveform of the sync bit portion consisting of successive "0" bits, for example. Then, the first peak interval (distance) value of the segment to be encoded is added to the total of the peak interval (distance) values in S303. Next, it is determined if the total of the peak interval (distance) value exceeds 0.9 times of the reference segment length. Since it will never exceeds 0.9 times of the reference segment length at the point when the first peak interval (distance) value is added, the next peak interval (distance) data is picked out in S307 and added to the peak interval (distance) value total, returning to S303. As the above operations are repeated several times, S304 determines that the total of the peak interval (distance) values exceeds 0.9 times of the reference segment length at some point; at that time, it is checked in S305 if the number of the peak interval (distance) values which have been added is even.

If the number is not even at the determination in S306, the next peak interval (distance) data is picked out in S307, and S304 and S305 are repeated. If the number of the peak interval (distance) values is determined as even in S305, the operation proceeds to S306 in which it is checked if the total of the peak interval (distance) values is less than 1.1 times of the reference segment length. If the total of the peak interval (distance) values is less than 1.1 times of the reference segment length, segmentation for one character ceases here. If the total of the peak interval (distance) values is more than 1.1 times of the reference segment length, it can be determined that the peak interval (distance) value total is too great; therefore, the last two of the peak interval (distance) values are subtracted from the peak interval (distance) value total and the value of the pointer that counts the number of the peak interval (distance) values is reduced by "2". The reason why two of the peak interval (distance) values are subtracted is to satisfy the condition that the number of the peak interval (distance) values can be only even.

A segment for one character can be obtained In the above manner. The operation of this segmentation will be applied in the example of FIG. 7. FIG. 7 illustrates the example in which the reference bit cell length is "63", and accordingly the reference segment length is "315". The total of the first through eighth peak interval (distance) values is "323", which satisfies the condition of more than 0.9 times and less than 1.1 times of the reference segment length; thus, this segment is adopted. The total number of the peak interval (distance) values is determined within 0.9~1.1 times of the reference segment length as above because it is experimentally understood that, as long as the total value is within this range, most of the segments, each of which corresponds to one character, can be obtained without errors.

Regarding the segment picked out in the above manner, each of the peak interval (distance) values which constitute the segment, is checked and converted to binary data. Here, this operation is denoted as a bit conversion. S205 in FIG. 2 explains the bit conversion, and FIG. 8 describes it in more detail. The bit conversion of FIG. 8 will be described referring to FIG. 7. In S40, the total of the peak interval (distance) values is reset to "0", and the number of unprocessed bits is set to 7 or 5. In S41, the reference cell length is set by calculating (segment length−peak interval (distance) value total)/the number of unprocessed bits; the reference boundary value be set by calculating (peak interval (distance) value total+reference cell length); a threshold A be set by calculating (reference boundary value−reference cell length×0.3); and a threshold B be set by calculating (reference boundary value+reference cell length×0.3).

In the example of FIG. 7, the segment length is "323", the peak interval (distance) value total is zero at the beginning, and the initial value for the number of unprocessed bits is "5"; in S41, the reference cell length is set to be "64" by calculating 323/5. Since the total of the peak interval (distance) values is zero, the reference boundary value is "64". Consequently the threshold A is (64−64×0.3=44) and the threshold B is (64+64×0.3=83).

Figure 8:
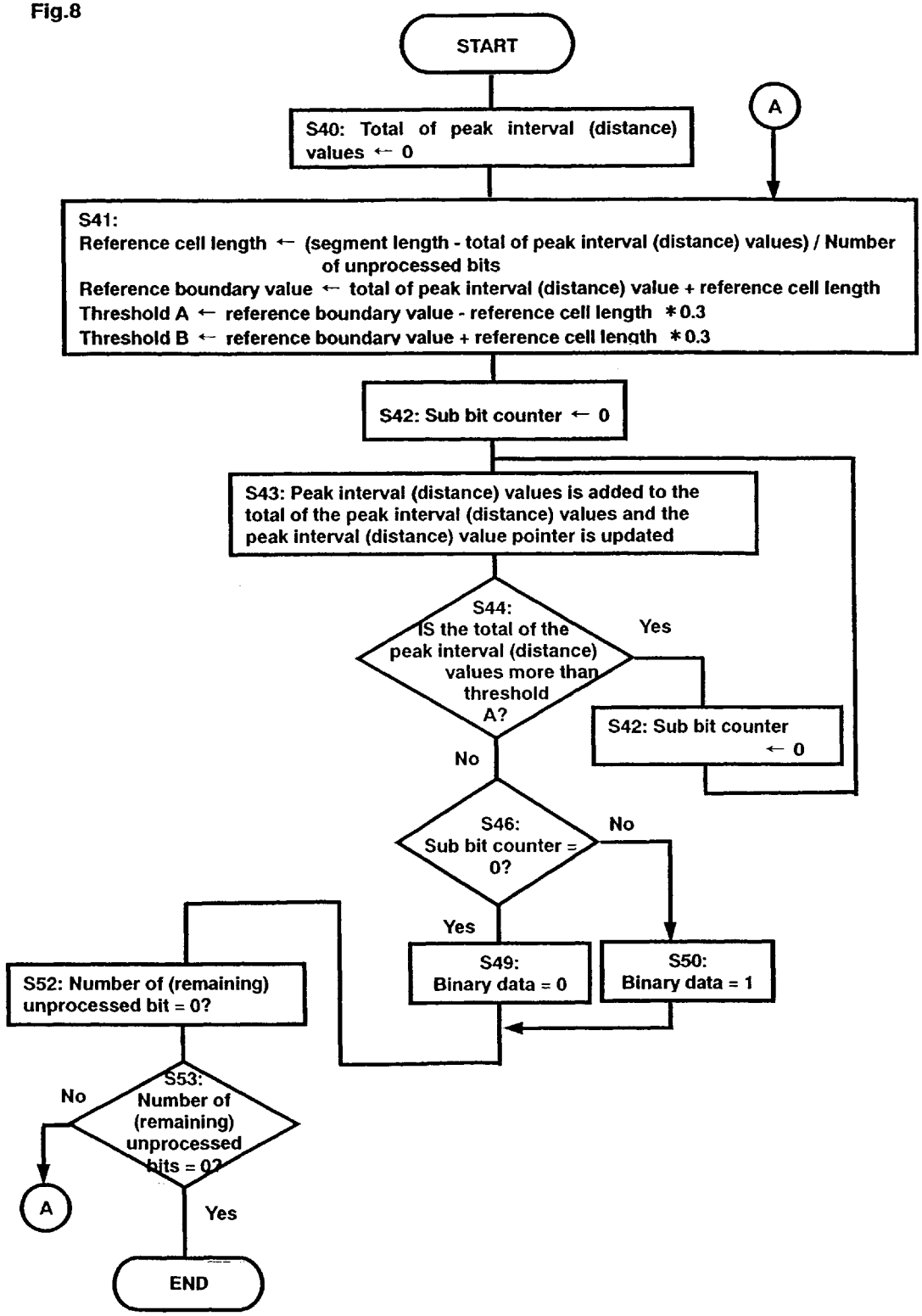
FIG. 8 is a flowchart of an example of the data demodulating operation in the embodiment of FIG. 7 of the present invention.

In S42 of FIG. 8, a sub bit count is reset to zero; in S43, the peak interval (distance) value is added to the total of the peak interval (distance) values, and the peak interval (distance) value pointer is updated. In the example of FIG. 7, the first peak interval (distance) value in the segment is "33"; as a result of adding "33" to the total of the peak interval (distance) values, the total is now "33". The peak interval (distance) pointer is updated to "1". The peak interval (distance) value total "33" is compared to the threshold A in S44; since it is smaller than "44" of the threshold A, this indicates that a peak exists in the reference cell length. Therefore, the sub bit counter increases (from 0 to 1 here) in S42', and then the operation returns to S43. In S43, the next peak interval (distance) value "31" is added to the total of the peak interval (distance) values, and the total changes to "63". This value is greater than the threshold A, "44", and smaller than the threshold B, "83"; therefore, the operation moves to S46 to determine if the sub bit counter indicates zero. The sub bit counter has increased to "1" in S42' as described above, so the operation moves to S50 and "1" is assigned to the first bit. In S52, the number of unprocessed bits changes from "5") to "4". The number of unprocessed bits is not "0" at this point, so the operation returns to S41 through the determination in S53.

In S41, the reference cell length, reference boundary value, threshold A, and threshold B are calculated as described above. At this time, the reference cell length is (323−63)/4=65; the reference boundary value is (63+65)=128; the threshold A is (128−65×0.3=108); the threshold B is (128+65×0.3=147). In S43, the peak interval (distance) value, "33", is added to the total to be (63+33=96). In the same manner as above, the operation proceeds as S44 and S42' and returns to S43 in which "33" is added to the peak interval (distance) value total "96", resulting in the total "129". Then, the operation proceeds as S44, S46, and S50 to obtain the second bit as "1". In S52, the number of the unprocessed bits changes from "4" to "3"; the result is not "0", so the operation returns to S41.

In S41, the reference cell length is calculated as (323−129)/3=64, the reference boundary value as (129+64=193), the threshold A as (193−64×0.3=174), and the threshold B as (193+64×0.3=212); each of the values is set in.

Then, the operation proceeds as S43, S44, S46 and S49 to obtain the third bit as "0". The operation is performed until the number of unprocessed bits becomes zero; the fourth bit is given ("1" and the fifth bit is given "0".

The bit line is obtained through the bit conversion in the above manner. The bit line obtained in the above example is "11010" which is converted into a character code. In this example, the data bits of the segment excluding parity bit are expressed by binary notation as "1011B". This is expressed by sexadecimal notation as "OBH". Therefore, it is understood that the character corresponding to the segment is "OBH".

As described in S211 of FIG. 2, segmentation, bit conversion, code conversion operations are repeated until LRC is demodulated. After LRC demodulation, LRC is tested and the overall demodulation result is confirmed in S212.

According to the embodiment described above, the reproduced analog waveform is converted to the digital signal, and then divided into segments, each of which is equal to the length of one character of the recorded data; on the segment as a unit of process, the size relationship of the peak interval (distance) values which constitute the segment is compared to the reference value to provide a bit line consisting of "0" and "1" bits to obtain the character code corresponding to the segment. Therefore, the binary data for each bit is demodulated incorporating the element of character time interval (distance) for one character. Compared to the conventional method by which the bit line is provided by a unit of a bit (not a unit of a segment for one character), false readings can be greatly reduced, and accordingly a highly reliable data demodulating method can be provided.

Also, since the boundaries between characters are predetermined by segments, even if a false reading occurs with a bit in the segment, demodulation of the successive segments will not be affected. Thus, compared to the conventional demodulating method performed per bit, false readings can be reduced.

In segmentation, the segment should satisfy the important condition that the polarity of the peak value at the starting point of the segment agrees with that of the ending point; to ensure the above, all the peaks are detected and all the time intervals (distances) are measured between adjacent peaks to create peak interval (distance) values; each of the peak interval (distance) values is added successively, the end of one character is determined with the peak position in the character time interval (distance) for one character, it is checked if the number of the peak interval (distance) values added until satisfying the ending condition is even, and if not even, one more peak interval (distance) value is added to make it even. Therefore, falsely determined segmentation boundaries are prevented, thus increasing reading accuracy.

Resume Of The First Embodiment

According to the present invention, in a data demodulating method in which binary data are defined by a frequency modulated signal composed of a combination of high and low frequency signals, data for one character are produced with a predetermined number of bits and a parity bit, and the binary data are demodulated depending on the detection whether or not a peak point exists within a predetermined time interval (distance) in the reproduced signal waveform obtained by reproducing the data signal, each of the peak interval (distance) values is added successively, the end of a character is determined by the peak position within the character time interval (distance) for one character, and the data are demodulated by a unit of one character. Thus, each bit is demodulated incorporating the element of the character time interval (distance) for one character, and accordingly false readings can be reduced to a great extent, compared to the conventional data demodulating method performed per bit, and a highly accurate data demodulating method can be obtained.

Also, according to the present invention, it is determined if the number of the peak interval (distance) values within the character time interval (distance) satisfies the condition of parity bit; if the condition is not satisfied, the next peak interval (distance) value is added to determine the end of the character. Therefore, the data corresponding to one character can be segmented with a reasonably high accuracy.

Further, according to the present invention, the parity bit is odd parity; it is checked if the number of the peak interval (distance) values within the character time interval (distance) satisfies the condition of the parity bit; if the condition is not satisfied, the next peak interval (distance) value is added to determine the end of the character. Therefore, the data corresponding to one character can be segmented with a reasonably high accuracy.

Furthermore, according to the present invention, the character time interval (distance) for one character is set based on the reference value which is made up of the reference bit cell lengths for one character. Therefore, the data corresponding to one character can be segmented with a reasonably high accuracy.

A Second Embodiment

The above first embodiment provides the data demodulating method by which a false reading of one bit will not affect successive bits in the bit line. In other words, a highly accurate data demodulating method is provided such that a character time interval (distance) for one character is determined by a reasonable method and the element of the character time interval (distance) for one character is used to reduce false reading to a great extent as the binary data is determined for each bit.

The present invention is devised considering the above conventional problems. In addition to the above embodiment, another object of the present invention is to provide a data demodulating method in which, even when peaks that originally do not exist appear or do not appear at expected positions, false reading can be reduced to a great extent, making a highly accurate data demodulation possible.

The above steps are carried out until LRC is demodulated. In other words, the steps are repeated over the entire length of the magnetic stripe of the magnetic card to generate the peak interval (distance) data line.

A segment for one character can be obtained In the above first embodiment. The operation of this segmentation will be applied in the example of FIG. 7. FIG. 7 illustrates the example in which the reference bit cell length is "63", and accordingly the reference segment length is "315". The total of the first through eighth peak interval (distance) values is "323", which satisfies the condition of more than 0.9 times and less than 1.1 times of the reference segment length; thus, this segment is adopted. The total number of the peak interval (distance) values is determined within 0.9~1.1 times of the reference segment length as above because it is experimentally understood that, as long as the total value is within this range, most of the segments, each of which corresponds to one character, can be obtained without errors.

Regarding the segment picked out in the above manner, each of the peak interval (distance) values which constitute the segment, is checked and converted to binary data. Here, this operation is denoted as a bit conversion. S205 in FIG. 2 explains the bit conversion, and FIG. 12 describes it in more detail. The bit conversion of FIG. 12 will be described referring to an example of FIG. 13 that contains an abnormal waveform. In this example (FIG. 13), the peak interval (distance) data proceeds as "19", "21", "32", "29", ... "34", "69", containing abnormal data.

In S40, the total of the peak interval (distance) values is reset to "0", and the number of unprocessed bits is set to 7 or 5.

In S41, the reference cell length is set by calculating (segment length−peak interval (distance) value total)/the number of unprocessed bits; the reference boundary value be set by calculating (peak interval (distance) value total+ reference cell length); a threshold A be set by calculating (reference boundary value−reference cell length×0.3); and a threshold B be set by calculating (reference boundary value+ reference cell length×0.3).

Figure 13:
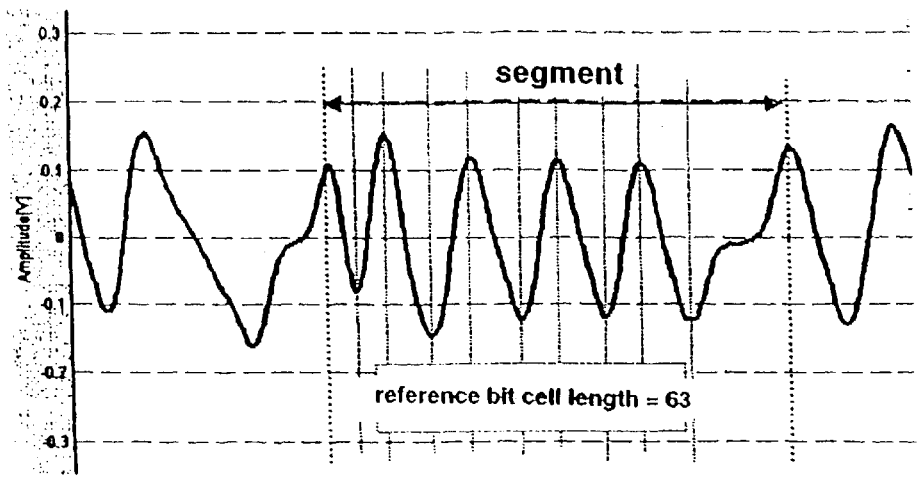
FIG. 13 is a waveform diagram showing a waveform containing a extra peak.

In the example of FIG. 13, the segment length is "322", the peak interval (distance) value total is zero at the beginning, and the initial value for the number of unprocessed bits is "5"; in S41, the reference cell length is set to be "64" by calculating 322/5. Since the total of the peak interval (distance) values is zero, the reference boundary value is "64". Consequently the threshold A is (64−64×0.3= 44) and the threshold B is (64+64×0.3=83).

Figure 12:
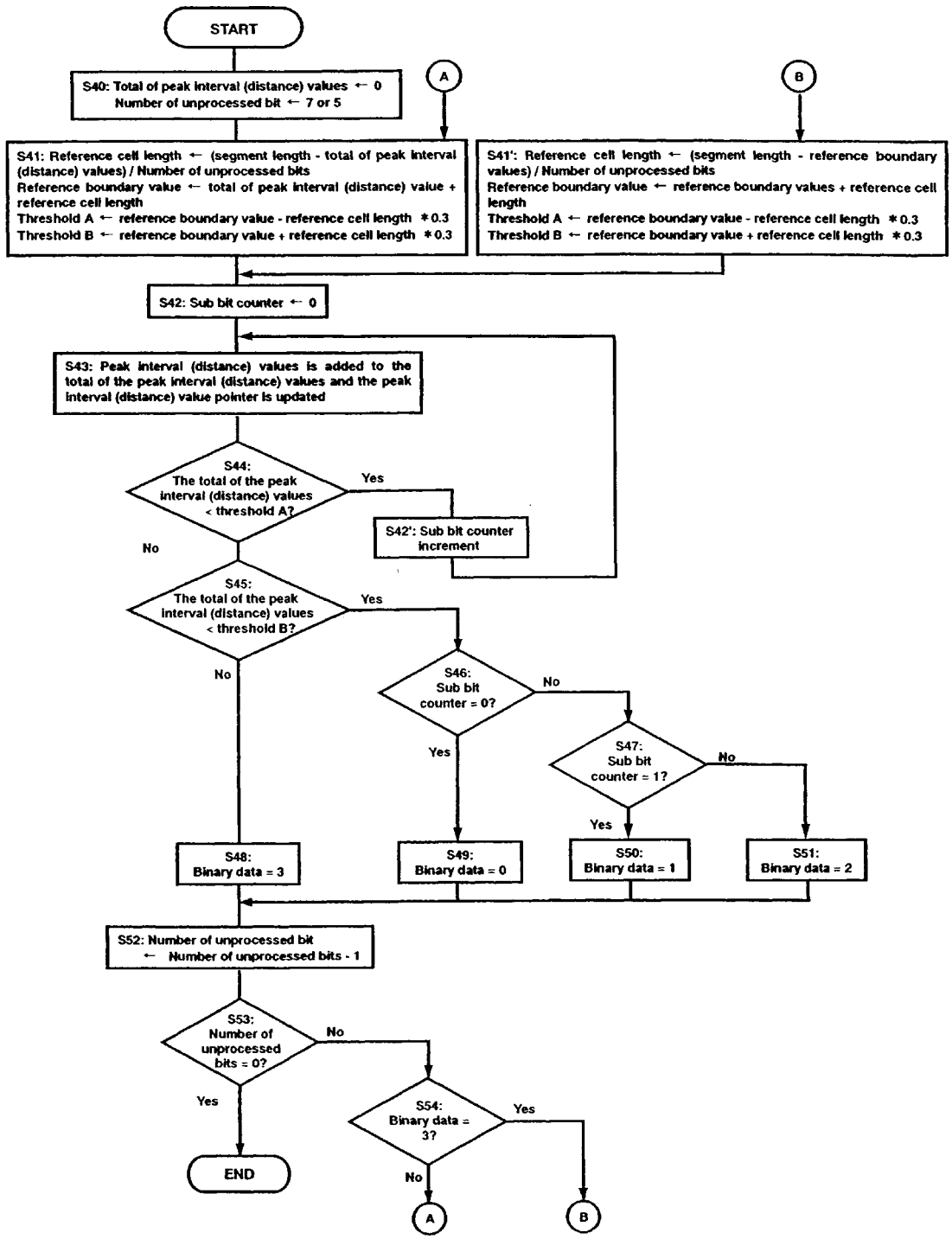
FIG. 12 is a flowchart of an example of bit conversion in the embodiment of the present invention.

In S42 of FIG. 12, a sub bit count is reset to zero; in S43, the peak interval (distance) value is added to the total of the peak interval (distance) values, and the peak interval (distance) value pointer is updated. In the example of FIG. 13, the first peak interval (distance) value in the segment is "19"; as a result of adding "19" to the total of the peak interval (distance) values, the total is now "19". The peak interval (distance) pointer is updated to "1". The peak interval (distance) value total "19" is compared to the threshold A in S44; since it is smaller than "44" of the threshold A, this indicates that a peak exists in the reference cell length. Therefore, the sub bit counter increases (from 0 to 1 here) in S42', and then the operation returns to S43. In S43, the next peak interval (distance) value "21" is added to the total of the peak interval (distance) values, and the total changes to "40".

Since this value is greater than the threshold A=44, and smaller than the threshold B=83, the sub bit counter increases (from 1 to 2 in this example) in S42' and the process returns to S43.

The next peak interval (distance) value "32" is added to the total of the peak interval (distance) values and the total changes to "72". Since this value is greater than the threshold A and smaller than the threshold B, the steps proceed as S44, S45, and S46 in which it is determined if the sub bit counter counts zero. The sub bit counter has increased to "2" in S42' as described above, so the operation moves to S51 and "2" is assigned to the first bit. In S52, the number of unprocessed bits changes from "5" to "4". The number of unprocessed bits is not "0" at this point, and the binary data is not "3", so the operation returns to S41 through the determination in S53.

In S41, the reference cell length, reference boundary value, threshold A, and threshold B are calculated as described above. At this time, the reference cell length is (322−72)/4=62; the reference boundary value is (72+62)= 134; the threshold A is (134−62×0.3=116); the threshold B is (134+62×0.3=152). In S43, the peak interval (distance) value, "29", is added to the total to be (72+29=101). In the same manner as above, the operation proceeds as S44 and S42' and returns to S43 in which "35" is added to the peak interval (distance) value total "101", resulting in the total "136".

Then, the steps S44, S45, S46, S47, and S50 are carried out in this order, and the second bit is determined as "1". In S52, the number of unprocessed bits changes from "4" to "3". Since the result is not "0" and the binary data is not "3" either, the process returns to S41 via S54.

In S41, the reference cell length is calculated as (322− 136)/3=62, the reference boundary value as (136+62=198), the threshold A as (198−62×0.3=180), and the threshold B as (198+62×0.3=216); each of the values is set in.

The operation proceeds as S43, S44, S42', S43, S44, S45, S46, S47, and S50, and the third bit is determined as "1". The steps are carried out until the number of unprocessed bits becomes zero, and the fourth bit is determined as "1" and the fifth bit as "0".

By the bit conversion in the above manner, the bit line expressed by binary data can be obtained. The bit line in the above embodiment is "21110", which is converted to a character code. In this embodiment, the first bit is "2" which is abnormal; if four other bits except the first bit are regarded correct, the number of the "0" bit contained in one character should be odd and the number of the "1" bit be even because of the characteristic condition of odd parity. The four normal bits consist of one "0" bit and three "1" bits; therefore, the remaining one bit should be "0". Accordingly, it is understood that the original bit line is "01110" and the character corresponding to the segment can be presumed as "OEH".

As described in S211 of FIG. 2, segmentation, bit conversion, code conversion operations are repeated until LRC is demodulated. After LRC demodulation, LRC is tested and the overall demodulation result is confirmed in S212.

According to the embodiment described above, the reproduced analog waveform is converted to the digital signal, and then divided into segments, each of which is equal to the length of one character of the recorded data; on the segment as a unit of process, the size relationship of the peak interval (distance) values which constitute the segment is compared to the reference value to provide a bit line consisting of "0" and "1" bits to obtain the character code corresponding to the segment. Therefore, the binary data for each bit is demodulated incorporating the element of character time interval (distance) for one character. Compared to the conventional method by which the bit line is provided by a unit of a bit (not a unit of a segment for one character), false readings can be greatly reduced, and accordingly a highly reliable data demodulating method can be provided.

In addition, since each of the peak interval (distance) values which constitute one character is compared to the reference value to convert the signal waveform to a bit line of binary data, it can be detected if the peak interval (distance) value is extremely small or great compare to the reference value. By using the bit value corresponding to the abnormal peak interval (distance) value, it can be detected that an abnormal waveform exists in the segment currently under evaluation.

If the segment contains an abnormal waveform, that is detected in the above manner. Accordingly, It can be detected that the reading result may differ from the original data; if abnormal data is detected, a warning can be sent to the higher level apparatus.

The peak interval (distance) vales, each of which is a constituent of one character, are compared to the reference value to convert the signal waveform to a bit line of binary data; therefore, even if the reproduced signal is distorted due to scratches or contamination on the recording medium of the magnetic card, etc., the original character code can be presumed, thus improving reading performance.

Figure 14:
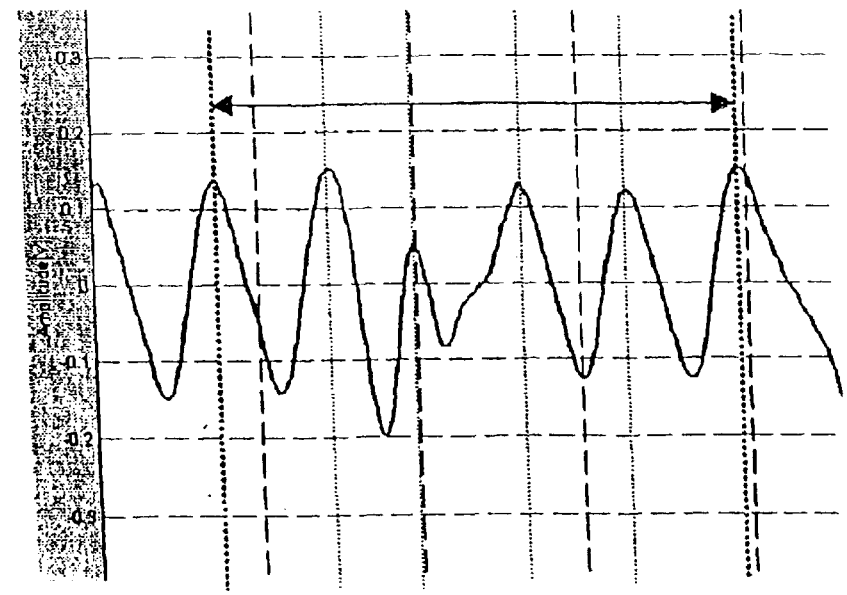
FIG. 14 is a waveform diagram showing a waveform with which the conventional data demodulating method causes a false reading.

In the above embodiment, the signal obtained by reading the recording medium is converted in one direction to obtain a bit line. However, a bit conversion may be performed in both directions to obtain bit lines. Then, even if the reproduced waveform is as illustrated in FIG. 14, a correct bit line can be obtained. This form of the embodiment will be described hereinafter. The configuration of the hardware (as the card reader) remains the same as the example of FIG. 1.

Figure 15:
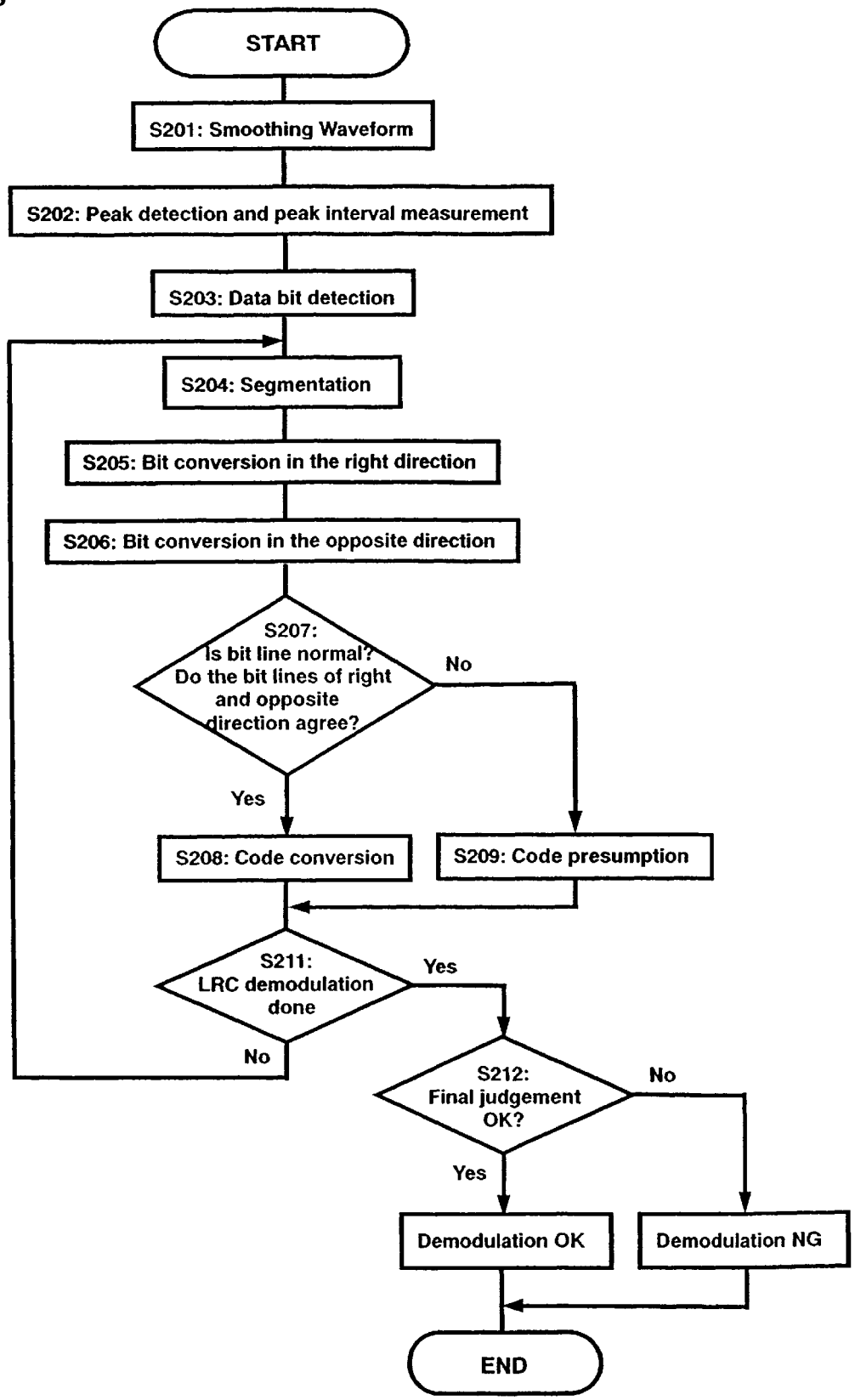
FIG. 15 is a flowchart of another embodiment of the data demodulating method of the present invention.

FIG. 15 shows a demodulating operation of this embodiment. Waveform smoothening in S201, peak detection and peak interval (distance) measurement in S202, data bit detection in S203, segmentation in S204, and bit conversion in S205 are performed in the same manner as the embodiment as in FIG. 2. Note that the bit conversion in S205 is in the right direction, but the bit conversion in S206 is performed in the opposite direction, that is, the reproduced waveform is converted to the bits from the opposite direction. The bit conversion of the right direction in S205 is performed such that the conversion proceeds in the direction the line number increases, starting with the first element of the peak interval (distance) data line that constitutes the segment for one character and ending with the last element. The bit conversion of the opposite direction in S206 is performed such that the conversion proceeds in the direction the line number decreases, starting with the last element of the peak interval (distance) data line that constitutes the segment for one character and ending with the first element. The segmentation in S204 is performed in the same manner as one illustrated in FIG. 6.

Two bit lines obtained by the different bit conversions of right and opposite directions are compared to one another in S207. If both agree with one another, it is determined that the waveform has been read correctly, and the bit line is converted to the character code and adopted as it is. If two bit lines provided by the bit conversions of right and opposite directions disagree with one another, it is determined that the reading of the segment is false. In such a case, the bit is presumed for the portion of which the two bit lines obtained by the ongoing and opposite directions differ from one another, and candidates for the character code are determined. The segmentation, bit conversions of right and opposite directions, determinations of agreement between the bit lines obtained by the bit conversions of the different directions, and code conversion or code presumption are repeated until the LRC is demodulated as shown in S211. After LRC demodulation, the LRC is tested in S212 as a last step. In other words, it is comprehensively determined whether the overall demodulation result is correct. Then, the operation ceases.

Figure 9:
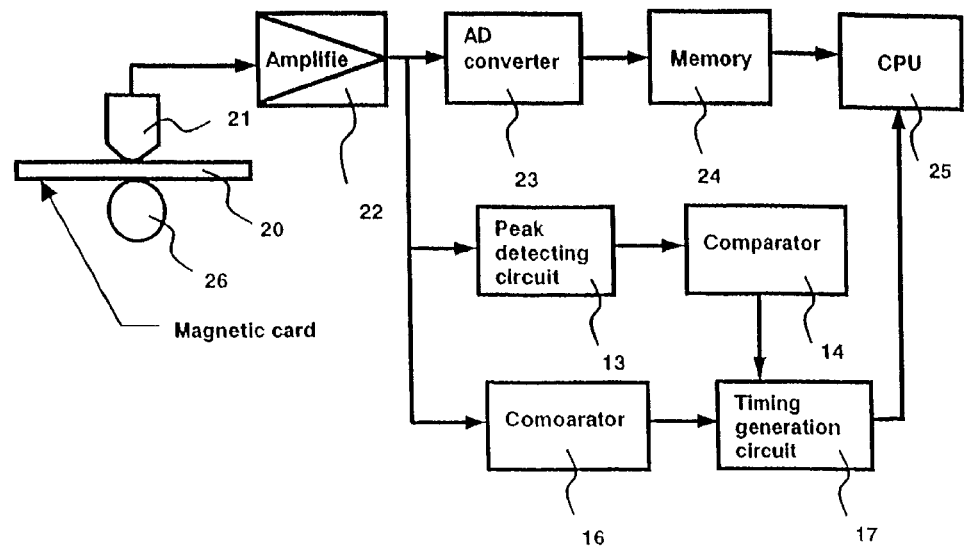
FIG. 9 is a functional block diagram of another embodiment of the data demodulating method of the present invention.
Figure 16:
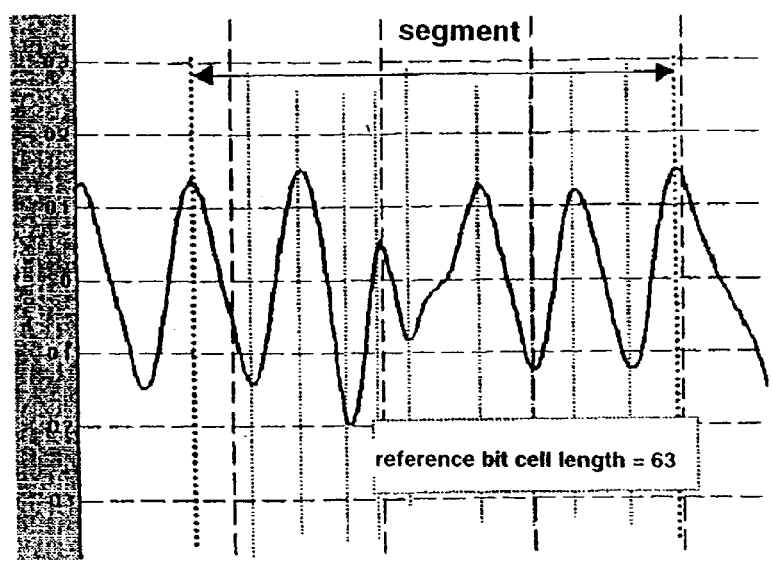
FIG. 16 is a waveform diagram showing a waveform which the embodiment of FIG. 15 can demodulate correctly but the conventional data demodulating method causes false reading.

The bit conversion in the right direction in S205 and the bit conversion in the opposite direction are described in detail referring to FIG. 16 and FIG. 9. The waveform illustrated in FIG. 16 is the same as one in FIG. 14; the peak interval (distance) value line of the target segment proceeds as "39", "33", "32", "21" . . . "37, and "30" containing an abnormal waveform. First, the bit conversion is performed in the right direction. In the example of FIG. 16, since the segment length is "322" and the initial value of the number of unprocessed bits is "5", the reference cell length is (322/5="64"). Since the total of the peak interval (distance) values is "0", the reference boundary value is "64". Consequently the threshold A is (64−64×0.3="44") and the threshold B is (64+64×0.3="83").

The first peak interval (distance) value of the segment is "39", and as a result of adding this value to the peak interval (distance) value total in S43, the total changes to "39". This value is compared to the threshold A; since it is smaller than the threshold A, the sub bit counter increases from 0 to 1 in S42' and the operation returns to S43.

The next peak interval (distance) value "33" is added to the total of the peak interval (distance) values and accordingly the total becomes "72". Since this value is greater than the threshold A and smaller than the threshold B, the step S46 is carried out via S44 and S45. Since the sub bit counter counts "1" at this time, the step S50 is selected after S47 and the first bit is determined as "1". The number of unprocessed bits changes from "5" to "4" in S52; this is still not "0" and the binary data is not "3" either, the process returns to S41.

The reference cell length is (322−72)/4="62", the reference boundary value is (72+62="134"), the threshold A is (134−62×0.3="116"), and the threshold B is (134+62×0.3= "152"). In S43, the peak interval (distance) value "32" is added to the total of the peak interval (distance) values and the total becomes (72+32="104"). Since this value is smaller than the threshold A, the sub bit counter increases from 1 to 2, and the process returns to S43. The next peak interval (distance) value "21" is added to the total of the peak interval (distance) values and the total becomes "125". The operation proceeds as S44, S45, S46, S47, and S50, and the second bit is determined as "1".

In S52, the number of unprocessed bits changes from "4" to "3"; this is still not "0" and the binary data is not "3" either, the operation returns to S41 via S53 and S54. The steps are repeated until the number of unprocessed bits counts "0", and the third bit is determined as "1", the fourth bit as "1", and the fifth bit as "1". In this manner, the bit line "11111" is obtained by the bit conversion in the right direction.

Next, the bit conversion is performed in the opposite direction. The beginning of the step is the same as that in the right direction. The segment length is "322", the initial value of the number of unprocessed bits is "5", the reference cell length is "64", the threshold A is "44", and the threshold B is "83". In the example of FIG. 16, the last peak interval (distance) value of the segment is "30"; this value "30" is added to the total of the peak interval (distance) values in S43 and the total becomes "30". The total value "30" is compared to the threshold A in S44; since it is smaller than the threshold A, the sub bit counter increases in S42' and the operation returns to S43. The next peak interval (distance) value "37" is added to the total of the peak interval (distance) values and the total becomes "67". This value is greater than the threshold A and smaller than the threshold B, the operation proceeds as S44, S45, and S46. Since the sub bit counter counts "1", the step S50 is selected after S47, and the first bit is determined as "1".

The number of unprocessed bits changes from "5" to "4" in S52. Since this is not "0" and the binary data is not "3", the operation returns to S41 after S53 and S54. The steps are repeated in the same manner and finished when the number of unprocessed bits becomes "0". Consequently the second, third, fourth, and fifth bits are respectively given "1", "0", "2", and "1". This bit line is rearranged in the opposite order to make it in the same order as the bit line obtained by the aforementioned bit conversion in the right direction. With this, a bit line "12011" is obtained.

Next, in S207 of FIG. 15, the bit line obtained by the bit conversion in the right direction and that obtained by the bit conversion in the opposite direction are compared to each other to determine if the bit lines are correct and agree with one another. If the segment waveform is normal, the bit lines obtained by the bit conversions performed in the right direction and opposite direction should agree with each other. In the example of FIG. 16, however, they obviously disagree. It is understood that the disagreement between the bit lines is caused by an abnormal waveform in the segment. In comparison, the bit lines are different from one another on the second and third bits; therefore, the bit line is expressed as "1xx11", and the bits "xx" are presumed in S209. Because of the characteristic condition of odd parity, xx={"00", "11"}; therefore, the character expressed by this segment is "10011" (19H) or "11111" (1FH).

Finally, an overall judgement is performed in the following manner. If there is no abnormal segments, a normal LRC check is performed. If there is an abnormal segment, the operation is performed according to the number of abnormal segments. When there is one abnormal segment, the original character code of the segment is presumed from a normal LRC calculation. When two or more abnormal segments, the LRC calculation is operated on all the combinations of character candidates for each of the segments and compared to the LRC recorded on the card, and the character combination which agrees with the LRC recorded on the card is adopted as the most possible character set. If there is no matching character combination, the character candidate for each abnormal segment is adopted as reference data and the reading result together with the character of the normal segment.

In an example of FIG. 16, there is one abnormal segment, and the character candidates for the segment are narrowed down to "19H" and "1FH" by character presumption. First, the LRC is tested assuming that "19H" is correct. Then, the LRC is tested assuming that "1FH" is correct. Note that, since "1FH" is of an ETX code, the next character after this ETX character is used as the LRC on the card at the LRC check. As a result of the LRC check, if LRCs agree when assuming that "19H" is correct, the character for the abnormal segment is determined as "19H"; if LRCs agree when assuming that "1FH" is correct, the character for the abnormal segment is determined as "1FH". If LRCs disagree for either assumption, these two possible characters are taken as reference data and the reading result together with the character of the normal segment.

According to the above described embodiment, two kinds of bit lines are obtained by performing the bit conversions in the right and opposite directions, and it is determined if the segment is correct by observing if these bit lines agree with one another; therefore, it can be determined whether or not the segment is normal, and also the abnormal waveform which could not be found with the bit line obtained by the bit conversion in a single direction can be now read by presumption, thus improving data demodulating performance to a great extent.

Next, another embodiment illustrated in FIG. 9 will be described. In this embodiment, the functional block diagram shown in the upper row consisting of amplifier 22, A/D converter 23, memory 24, and CPU 25 is configured the same as the embodiment of FIG. 1. The functional block diagram shown in the lower row consisting of peak detecting circuit 13, comparator 14, comparator 16, and timing generation circuit 17 is essentially the same as the conventional example of FIG. 10. In other words, this embodiment is a combination of the embodiment of FIG. 1 and the conventional method of FIG. 10, whereby a more accurate data demodulation can be performed.

Figure 10:
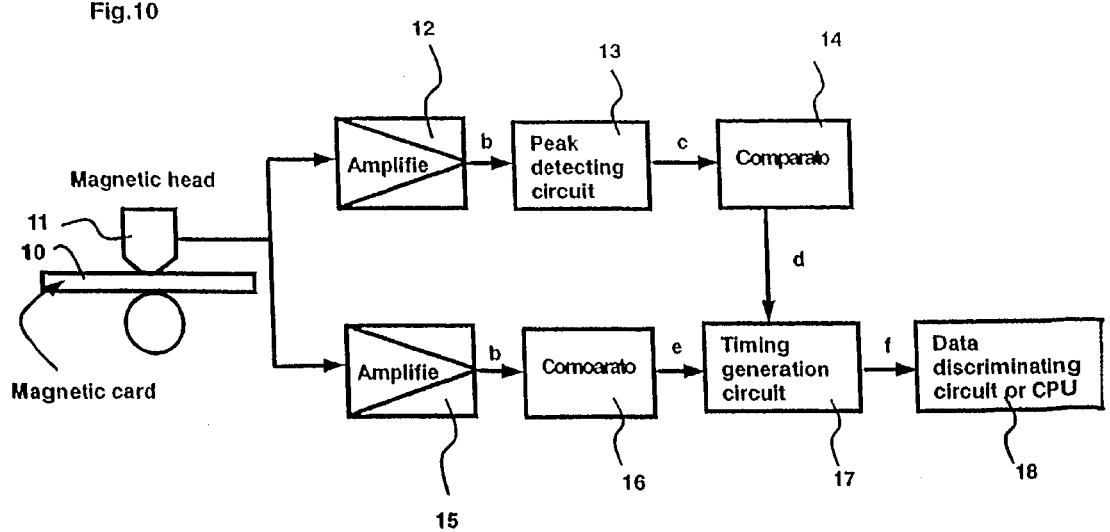
FIG. 10 is a functional block diagram of an example of a conventional data demodulating method.
Figure 11:
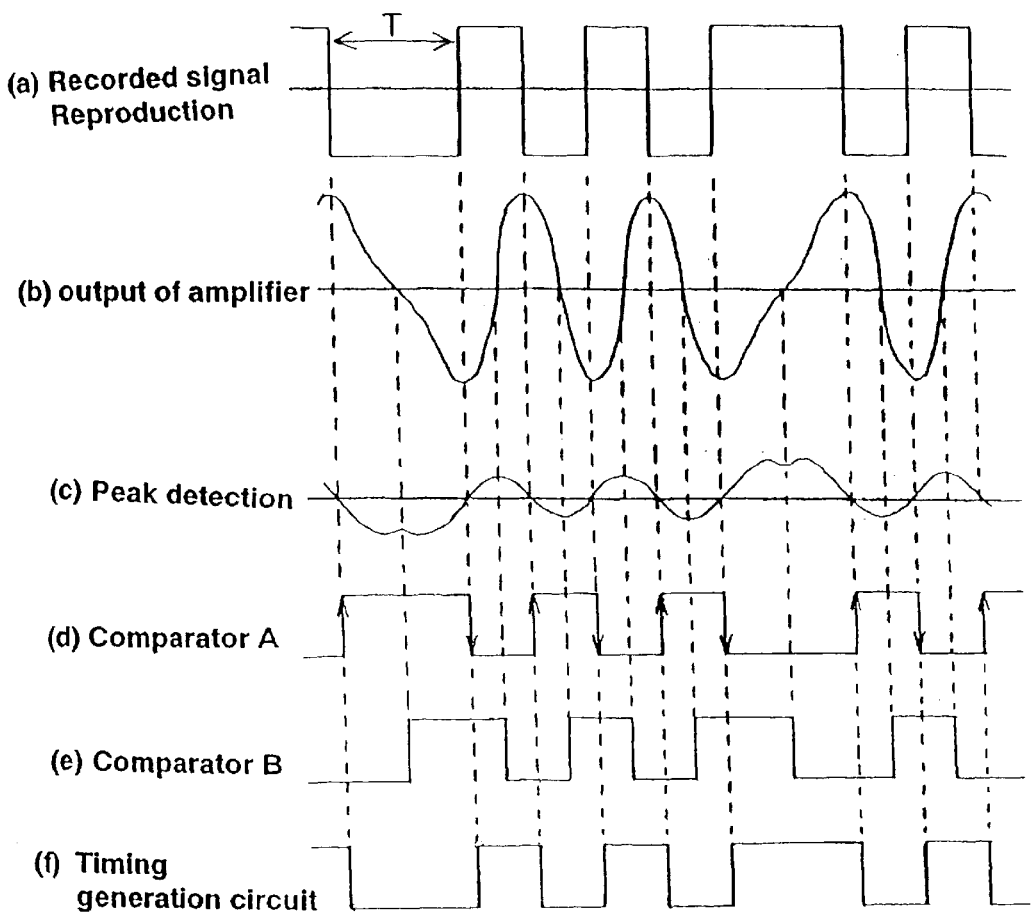
FIG. 11 is a timing chart showing the operation of the conventional data demodulating method of FIG. 10.

In the conventional functional block diagram of FIG. 10, the reading data pulse output of the analog circuit is demodulated in the data discriminating circuit or CPU 18 through the aforementioned conventional method. However, leaving the functional block diagram in the conventional example of FIG. 10 as it is, the data demodulating method by the data discriminating circuit or CPU 18 can be replaced by the data demodulating method of the present invention.

The data demodulating method of the present invention can be applied to motor-driven magnetic card readers as well as manual magnetic card readers.

Resume Of The Second Embodiment

According to the present invention, the reproduced signal is divided into segments, each of which corresponds to the length of one character; taking each segment as a unit of process, each of the peak interval (distance) values that constitute the segment is compared to a reference value to obtain the bit line and then to obtain the corresponding character code; the binary data for each bit is demodulated using the element of character time interval (distance) for one character. Therefore, false readings are greatly reduced, compared to the conventional method in which a bit line is obtained by operating each bit as a process unit, thus providing a highly reliable data demodulating method. In addition, since each of the peak interval (distance) values which constitute one character is compared to reference values to convert the reproduced signal to a bit line of binary data, it can be detected if the peak interval (distance) value is extremely great or small; by using the bit value corresponding to the abnormal peak interval (distance) value, it can be detected that there is an abnormal waveform in the segment currently under evaluation.

According to the present invention, the aforementioned reference value is set to have a certain range based on an ideal interval (distance) value; it is detected that the waveform contains an abnormal portion when the peak interval (distance) value is smaller or greater than the reference value; and the abnormal waveform is corrected according to the characteristic condition of parity bit to demodulate the data for one character. Therefore, the abnormal waveform is pinpointed accurately for correction, thus further increasing reliability of data demodulation.

According to the present invention, each of the peak interval (distance) values from the peak interval (distance) value data line is added successively to determine the end of the character; then, each of the peak interval (distance) values which constitute one character is compared to the reference value in the right direction and the opposite direction to obtain two bit lines, and the data for the character is demodulated based on the two bit lines. Therefore, compared to the method in which each of the peak interval (distance) values is compared to the reference value in the single direction, an abnormal waveform can be determined more accurately, thus further increasing reliability of data demodulation.

According to the present invention, the reference value is set to have a certain range based on an ideal distance value, and when the peak interval (distance) value is smaller or greater than the reference value, each of the peak interval (distance) values which is a constituent of the character is compared to the reference value in the right and opposite directions.

According to the present invention, if the bit line obtained by comparison in the right direction disagrees with that in the opposite direction, the different portion is corrected based on the characteristic condition of parity bit; therefore, the abnormal waveform can be more accurately determined and the portion that is determined abnormal can be corrected based on the predetermined condition.

According to the present invention, a character time interval (distance) for one character of the recorded data is defined as a predetermined range by a predetermined number of bits; the end of the character is determined with the peak position within the time interval (distance) for one character; it is detected whether or not the number of the peak interval (distance) values up to the peak position within the time interval (distance) satisfies the characteristic condition of parity bit; if the condition is not satisfied, the next peak interval (distance) value is added to determine the end of the character. Therefore, the end of the character can be accurately determined, and accordingly the character is accurately read and false reading can be greatly reduced.

According to the present invention, the parity bit is odd parity; it is detected whether or not the number of the peak interval (distance) values up to the peak position within the character time interval (distance) is an odd number; if the number is odd, the next peak interval (distance) value is further added to determine the end of the character. Therefore, the end of one character can be accurately determined, and accordingly the character is read accurately and false readings can be greatly reduced.

According to the present invention, the binary data for one bit is determined from one peak interval (distance) value in the peak interval (distance) value data line; the aforementioned one peak interval (distance) value is subtracted from the peak interval (distance) value total equal to one character, and the next reference value is determined with the remaining peak interval (distance) value total and the number of unprocessed bits. Therefore, the binary data of each bit which is a constituent of one segment can be accurately determined, and false readings can be greatly reduced.

A Third Embodiment

The above embodiments describe a method for demodulating data for one character in such a manner that the end of one character is determined by successively adding each of the peak interval (distance) values from the peak interval (distance) value data line, two bit lines are obtained by comparing each of the peak interval (distance) values that constitute one character with the reference value in the right and opposite directions of the data sequence, and the data for one character is demodulated on the basis of the two bit lines. With this, it is possible to provide a highly reliable data demodulation.

The above embodiments also describe a data demodulating method in which a set of predetermined ideal reference signal waveforms, each of which represents a character, are pre-stored; a reproduced signal corresponding to magnetically recorded data is divided into segments, each of which has a length equal to one character of the recorded data; at least one of the segments is compared to each of the reference signal waveforms by pattern matching to determine the degree of similarity with each reference waveform; and the character corresponding to the reference waveform showing the highest similarity is determined as the character expressed by the segment.

According to the above embodiments, reliability of data demodulation can be increased. However, even though a certain character could be allocated to the character, it is not guaranteed. Also, if the character cannot be determined because of a plurality of character candidates, every character candidate should receive equal attention; thus, there is further room for improvement to reduce the character candidates without errors.

Third Embodiment of a data demodulating method of the present invention is described referring to FIG. 1 through FIG. 9. FIG. 1 illustrates a functional block diagram of an example of hardware to operate the method of the present invention. In FIG. 1, on a magnetic stripe of magnetic recording medium, i.e., magnetic card 20, binary data composed of a frequency modulated signal made up of a combination of high and low frequencies, F and 2F. The data for one character is made up of a predetermined number of bits and a parity bit; the data for a plurality of characters is recorded. FIG. 1 shows an example of reproduction of recorded data from the magnetic card 20; when the magnetic card 20 is inserted to a recording/reproducing device, a transport roller 26 is driven by a motor (not shown), and transports the magnetic card 20 while making a magnetic stripe on the magnetic card 20 contact with a magnetic head 21 which reads data signal recorded on the magnetic stripe.

An output signal of the magnetic head 21 is amplified to the required signal intensity by an amplifier 22, sampled and converted to a digital signal by an A/D converter 23, and stored in a buffer memory 24. The data stored in the buffer memory 24 is read by CPU 25 for demodulating operation. The demodulating operation by CPU 25 will be described next.

Figure 17:
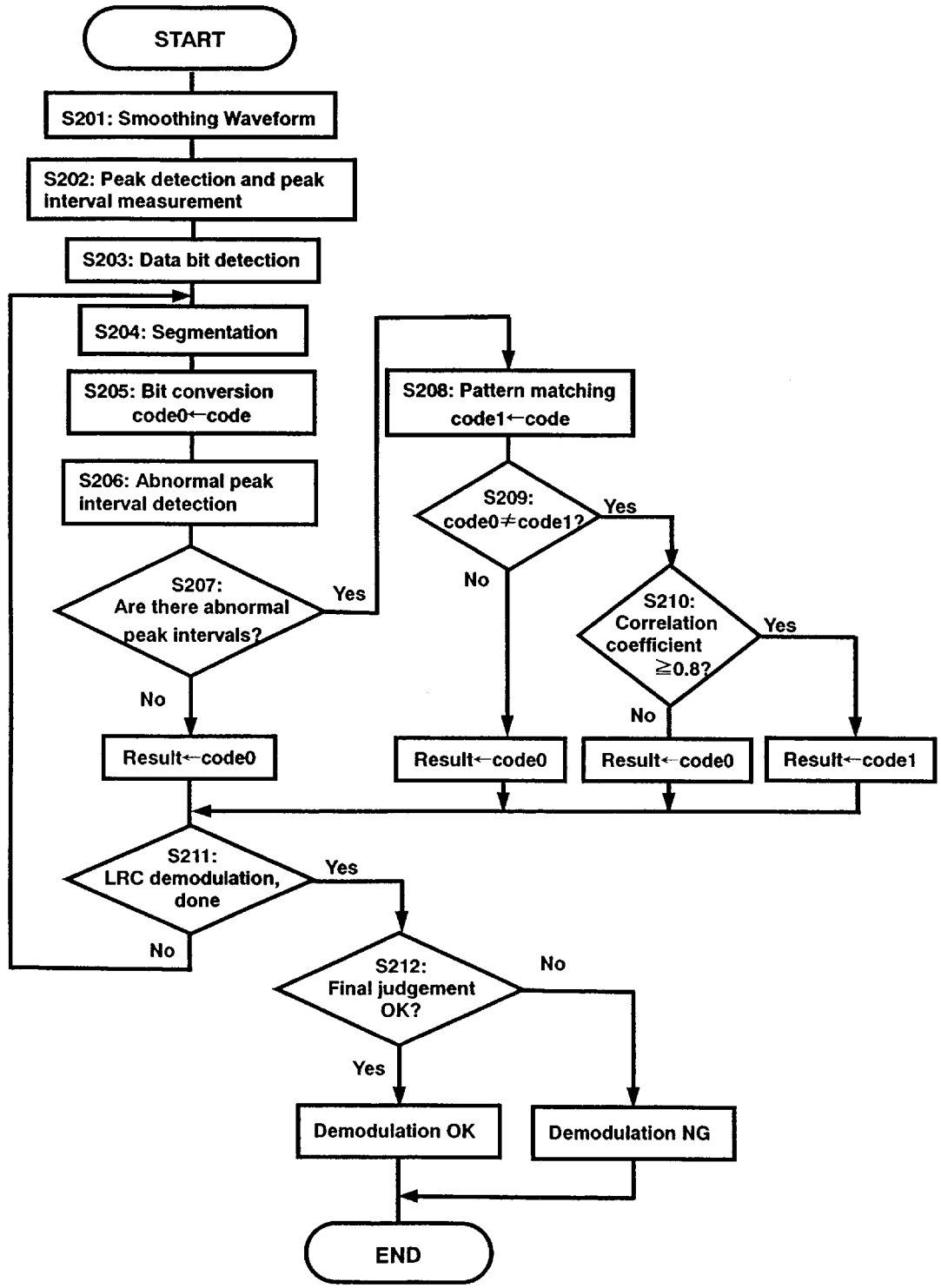
FIG. 17 is a flowchart showing a data demodulation operation of the embodiment of FIG. 1.

As shown in FIG. 17, the waveform is smoothed to remove spike noise in step 201 (hereinafter, step will be denoted as "S201", "S202" . . . ). In S202, peaks are detected successively, and the time interval (distance) is measured between the newly detected peak and the previous peak. In S203, data bits are detected. The data bit detection can be performed by detecting the data indicating the beginning of the recorded data.

The above steps are carried out until LRC is demodulated. In other words, the steps are repeated over the entire length of the magnetic stripe of the magnetic card to generate the peak interval (distance) data line.

Figure 4:
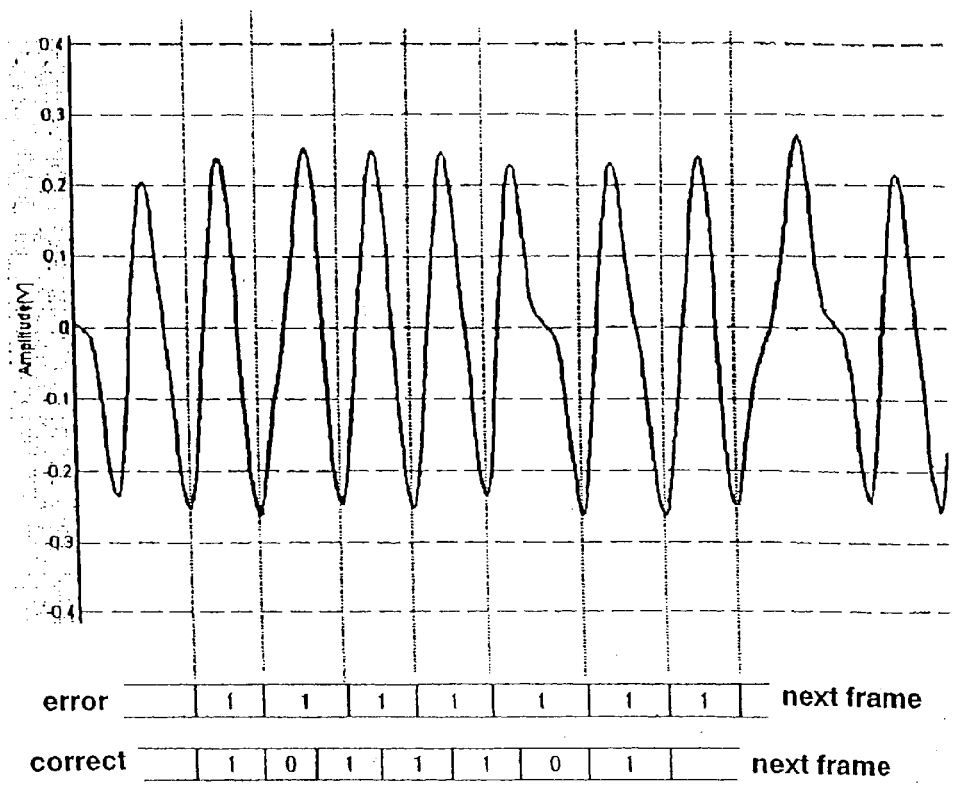
FIG. 4 is a waveform showing an example of a false reading in the data demodulation.

FIG. 4, FIG. 7 illustrates an example of a read waveform and an example of the peak interval (distance) data line (peak interval (distance) value line) of the waveform. By ISO standard, for example, the magnetic card has the first and third tracks having recording density of 210 BPI; if the card transporting speed is 190 mm/s, the time equal to one bit is 636.6 $\mu$s. If the sampling rate for A/D converting analog waveform is 10 $\mu$s, the logic value of data points included in one bit is 63.7. In the example of FIG. 7, the peak interval (distance) data line is as "64", "65", "33", "31", "33" . . . .

Figure 3:
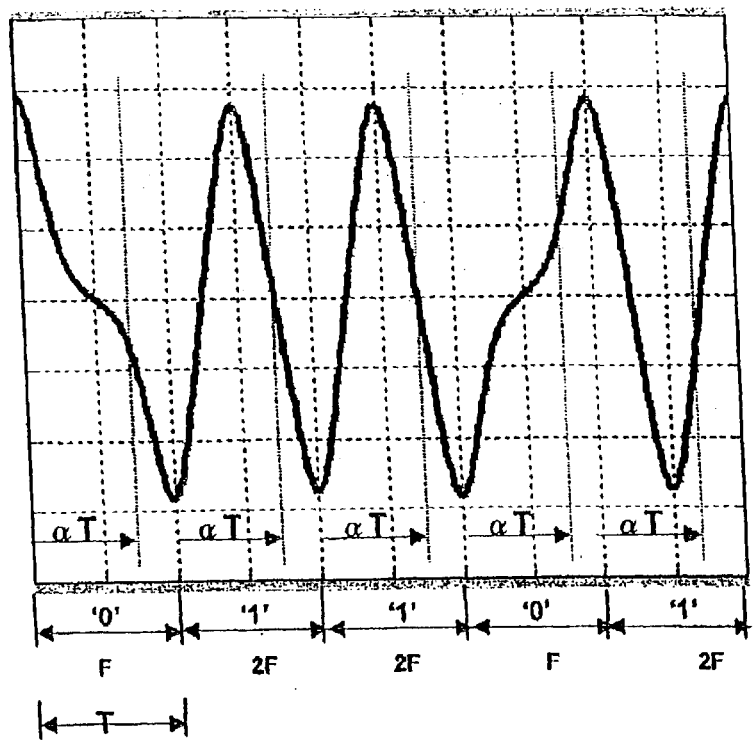
FIG. 3 is a waveform showing an F2F modulating method.

Segmentation is performed based on the peak interval (distance) data line. Segmentation means that the reproduced waveform data is divided into segments, each of which corresponds to a character (See S204 in FIG. 17). A specific example of steps of the segmentation will be described referring to FIG. 3, FIG. 7, FIG. 5. The waveform illustrated in FIG. 3, FIG. 7 are of the third track by ISO standard. The ISO third track expresses one character with total five bits made up of four data bits and one parity bit. Because of odd parity, the number of "0" bits is always even. Therefore, the number of the peak interval (distance) values that constitutes a segment is limited to six, eight, or ten.

When the number of the peak interval (distance) values is six, the segment corresponds to a character code consisting of four "0" bits and one "1" bit. When the number of the peak interval (distance) values is eight, the segment corresponds to a character code consisting of two "0" bits and three "1" bits; when ten, all the five bits represent "1" for a character code. In FIG. 7, and accordingly the peak interval (distance) data line is the same. Suppose that a target segment starts at the third value in the peak interval (distance) data line: when the number of the peak interval (distance) values is eight in this example, the total of the six peak interval (distance) values is 225; when eight, the total of the eight peak interval (distance) values is 323; when ten, the total of the ten peak interval (distance) data is 388.

FIG. 6 describes an example of the above segmentation. First, the total of the peak interval (distance) values is reset to zero (S301). Next, a reference segment length is set in S302. Since one character of the recorded data is expressed with five bits as described above, the reference segment length is set five times longer than a reference bit cell length. The reference bit cell length is obtained by measuring the waveform of the sync bit portion consisting of successive "0" bits, for example.

Then, the first peak interval (distance) value of the segment to be encoded is added to the total of the peak interval (distance) values in S303. Next, it is determined if the total of the peak interval (distance) value exceeds 0.9 times of the reference segment length. Since it will never exceeds 0.9 times of the reference segment length at the point when the first peak interval (distance) value is added, the next peak interval (distance) data is picked out in S307 and added to the peak interval (distance) value total, returning to S303. As the above operations are repeated several times, S304 determines that the total of the peak interval (distance) values exceeds 0.9 times of the reference segment length at lo some point; at that time, it is checked in S305 if the number of the peak interval (distance) values which have been added is even.

If the number is not even at the determination in S306, the next peak interval (distance) data is picked out in S307, and S304 and S305 are repeated. If the number of the peak interval (distance) values is determined as even in S305, is the operation proceeds to S306 in which it is checked if the total of the peak interval (distance) values is less than 1.1 times of the reference segment length. If the total of the peak interval (distance) values is less than 1.1 times of the reference segment length, segmentation for one character ceases here. If the total of the peak interval (distance) values is more than 1.1 times of the reference segment length, it can be determined that the peak interval (distance) value total is too great; therefore, the last two of the peak interval (distance) values are subtracted from the peak interval (distance) value total and the value of the pointer that counts the number of the peak interval (distance) values is reduced by "2". The reason why two of the peak interval (distance) values are subtracted is to satisfy the condition that the number of the peak interval (distance) values can be only even.

A segment for one character can be obtained In the above first embodiment. The operation of this segmentation will be applied in the example of FIG. 7. FIG. 7 illustrates the example in which the reference bit cell length is "63", and accordingly the reference segment length is "315". The total of the first through eighth peak interval (distance) values is "323", which satisfies the condition of more than 0.9 times and less than 1.1 times of the reference segment length; thus, this segment is adopted. The total number of the peak interval (distance) values is determined within 0.9~1.1 times of the reference segment length as above because it is experimentally understood that, as long as the total value is within this range, most of the segments, each of which corresponds to one character, can be obtained without errors.

[0025] of 88048

Regarding the segment picked out in the above manner, each of the peak interval (distance) values which constitute the segment, is checked and converted to binary data. Here, this operation is denoted as a bit conversion. S205 in FIG. 17 explains the bit conversion, and FIG. 12 describes it in more detail.

The bit conversion of FIG. 12 will be described referring to an example of FIG. 13) that contains an abnormal waveform. In this example (FIG. 13), the peak interval (distance) data proceeds as "19", "21", "32", "29" . . . "34", "69", containing abnormal data.

In S40, the total of the peak interval (distance) values is reset to "0", and the number of unprocessed bits is set to 7 or 5.

In S41, the reference cell length is set by calculating (segment length–peak interval (distance) value total)/the number of unprocessed bits; the reference boundary value be set by calculating (peak interval (distance) value total+ reference cell length); a threshold A be set by calculating (reference boundary value−reference cell length×0.3); and a threshold B be set by calculating (reference boundary value+ reference cell length×0.3).

In the example of FIG. 13, the segment length is "322", the peak interval (distance) value total is zero at the beginning, and the initial value for the number of unprocessed bits is "5"; in S41, the reference cell length is set to be "64" by calculating 322/5. Since the total of the peak interval (distance) values is zero, the reference boundary value is "64". Consequently the threshold A is (64−64×0.3= 44) and the threshold B is (64+64×0.3=83).

In S42 of FIG. 12, a sub bit count is reset to zero; in S43, the peak interval (distance) value is added to the total of the peak interval (distance) values, and the peak interval (distance) value pointer is updated. In the example of FIG. 13, the first peak interval (distance) value in the segment is "19"; as a result of adding "19" to the total of the peak interval (distance) values, the total is now "19". The peak interval (distance) pointer is updated to "1". The peak interval (distance) value total "19" is compared to the threshold A in S44; since it is smaller than "44" of the threshold A, this indicates that a peak exists in the reference cell length. Therefore, the sub bit counter increases (from 0 to 1 here) in S42', and then the operation returns to S43. In S43, the next peak interval (distance) value "21" is added to the total of the peak interval (distance) values, and the total changes to "40". Since this value is greater than the threshold A=44, and smaller than the threshold B=83, the sub bit counter increases (from 1 to 2 in this example) in S42' and the process returns to S43.

The next peak interval (distance) value "32" is added to the total of the peak interval (distance) values and the total changes to "72". Since this value is greater than the threshold A and smaller than the threshold B, the steps proceed as S44, S45, and S46 in which it is determined if the sub bit counter counts zero.

The sub bit counter has increased to "2" in S42' as described above, so the operation moves to S51 and "2" is assigned to the first bit. In S52, the number of unprocessed bits changes from "5" to "4". The number of unprocessed bits is not "0" at this point, and the binary data is not "3", so the operation returns to S41 through the determination in S53.

In S41, the reference cell length, reference boundary value, threshold A, and threshold B are calculated as described above, At this time, the reference cell length is (322−72)/4=62; the reference boundary value is (72+62)= 134; the threshold A is (134−62×0.3=116); the threshold B is (134+62×0.3=152). In S43, the peak interval (distance) value, "29", is added to the total to be (72+29=101). In the same manner as above, the operation proceeds as S44 and S42' and returns to S43 in which "35" is added to the peak interval (distance) value total "101", resulting in the total "136".

Then, the steps S44, S45, S46, S47, and S50 are carried out in this order, and the second bit is determined as "1". In S52, the number of unprocessed bits changes from "4" to "3". Since the result is not "0" and the binary data is not "3" either, the process returns to S41 via S54.

In S41, the reference cell length is calculated as (322− 136)/3=62, the reference boundary value as (136+62=198), the threshold A as (198−62×0.3=180), and the threshold B as (198+62×0.3=216); each of the values is set in.

The operation proceeds as S43, S44, S42', S43, S44, S45, S46, S47, and S50, and the third bit is determined as "1".

The steps are carried out until the number of unprocessed bits becomes zero, and the fourth bit is determined as "1" and the fifth bit as "0".

By the bit conversion in the above manner, the bit line expressed by binary data can be obtained. The bit line in the above embodiment is "21110", which is converted to a character code. In this embodiment, the first bit is "2" which is abnormal; if four other bits except the first bit are regarded correct, the number of the "0" bit contained in one character should be odd and the number of the "1" bit be even because of the characteristic condition of odd parity. The four normal bits consist of one "0" bit and three "1" bits; therefore, the remaining one bit should be "0". Accordingly, it is understood that the original bit line is "01110" and the character corresponding to the segment can be presumed as "OEH".

As described in S211 of FIG. 17, segmentation, bit conversion, code conversion operations are repeated until LRC is demodulated. After LRC demodulation, LRC is tested and the overall demodulation result is confirmed in S212.

According to the embodiment described above, the reproduced analog waveform is converted to the digital signal, and then divided into segments, each of which is equal to the length of one character of the recorded data; on the segment as a unit of process, the size relationship of the peak interval (distance) values which constitute the segment is compared to the reference value to provide a bit line consisting of "0" and "1" bits to obtain the character code corresponding to the segment. Therefore, the binary data for each bit is demodulated incorporating the element of character time interval (distance) for one character. Compared to the conventional method by which the bit line is provided by a unit of a bit (not a unit of a segment for one character), false readings can be greatly reduced, and accordingly a highly reliable data demodulating method can be provided.

In addition, since each of the peak interval (distance) values which constitute one character is compared to the reference value to convert the signal waveform to a bit line of binary data, it can be detected if the peak interval (distance) value is extremely small or great compare to the reference value. By using the bit value corresponding to the abnormal peak interval (distance) value, it can be detected that an abnormal waveform exists in the segment currently under evaluation. Even with this, however, a false reading as described below may occur.

Figure 18:
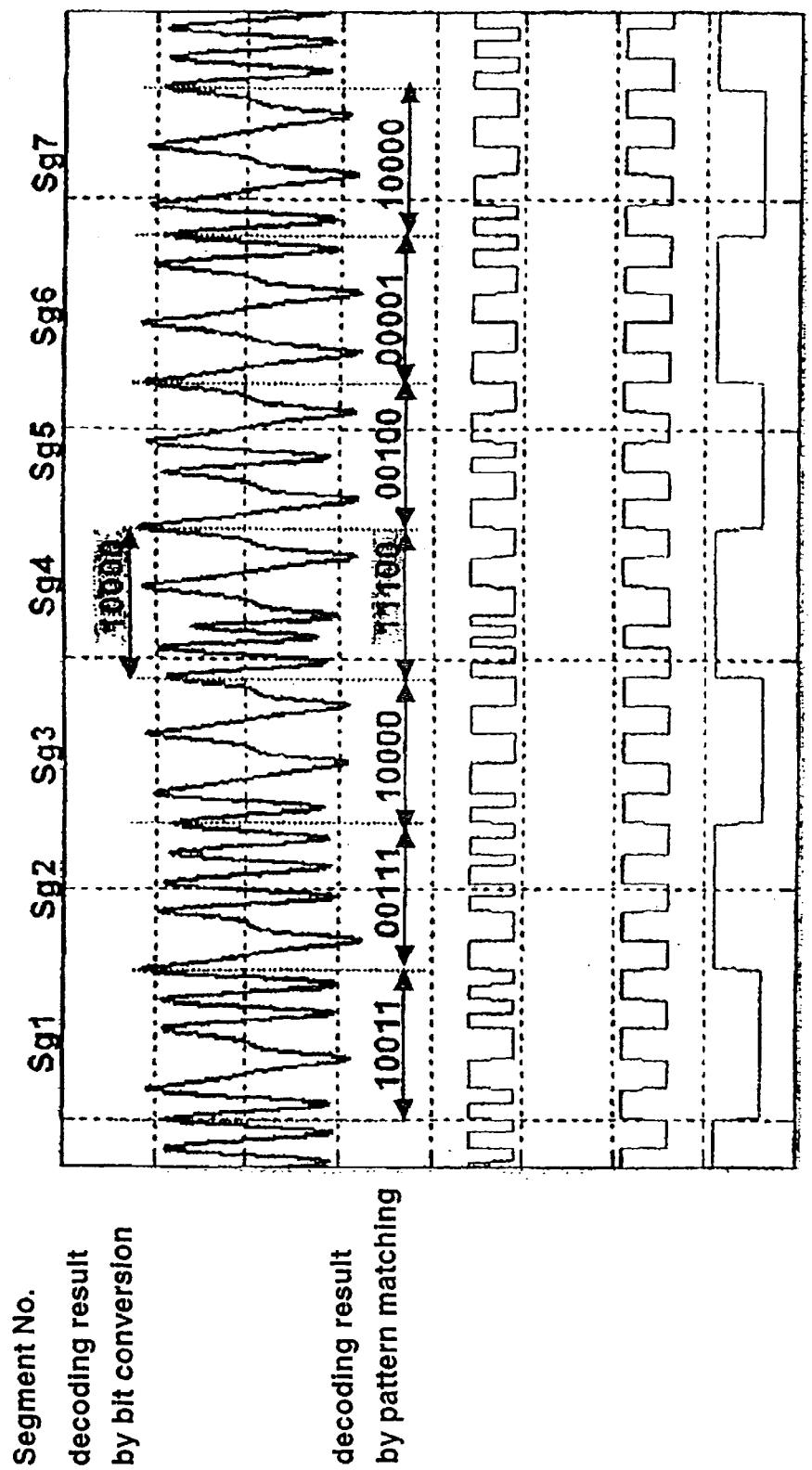
FIG. 18 is a timing chart for an example of a reproduced waveform and a demodulation result when performing the bit conversion and pattern matching in the above embodiment of the present invention.
Figures 19, 24:
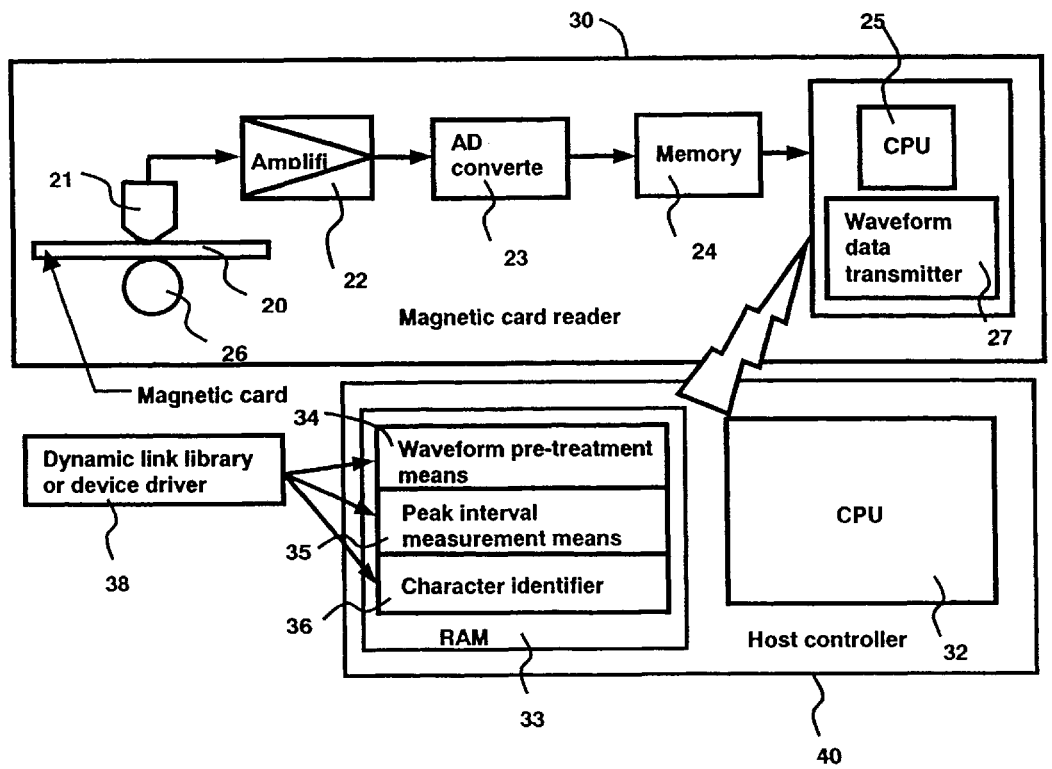
FIG. 19 is a diagram showing a correlation between the above bit conversion and the demodulation by pattern matching.
FIG. 24 is a functional block diagram showing another embodiment of the data demodulating method of the present invention.

FIG. 18 illustrates a portion of segmentation and bit conversion essentially performed on a magnetic stripe. In FIG. 18, Sg1, Sg2, Sg3 . . . respectively represent a segment for one character obtained by segmentation, and the decoding result by bit conversion for each segment is expressed by a bit line composed of "1" and "0" bits. FIG. 19 shows a line (sequence) of peak interval values of each segment. For example, the segment Sg1 is given a bit line of "10011" by bit conversion. The range for a normal peak interval (distance) value is set as a predetermined range, i.e., more than 0.7 times and less than 1.3 times of the reference bit cell length as described in FIG. 12; if the peak interval (distance) value is out of this range, it is determined that the segment may contain an abnormal peak interval (distance) value.

Reference cell length, reference boundary value, threshold A, and threshold B are set as described above, and bit conversion is performed on each segment. The number of the peak interval (distance) values in segment Sg1 is eight in the sequence of "33, 32, 64, 65, 34, 30, 32, 32" as illustrated in FIG. 19, all of which are within the range. Therefore, it is determined that there is no abnormal peak interval (distance) values, and the bit line of "10011" is adopted.

Since this is not of an LRC, the operation moves to the next segment. A bit line of "00111" is read out from the next segment Sg2; since all the peak interval (distance) values in the segment satisfy the condition for normal value, the bit line is adopted.

A peak interval (distance) value line is determined for all the segments in the above manner. In the example of FIG. 18 and FIG. 19, the bit line of segment Sg4 is "11100"; the peak interval (distance) value line is "33, 31, 24, 23, 23, 63, 64, 65", among which three values "24, 23, 23" do not satisfy the condition for normal value. Therefore, it is understood that abnormal waveform exists in the segment Sg4. It can be presumed that the second bit in the segment Sg4 is caused by extra two peaks which originally do not exist in this bit row, but has occurred for some reasons.

If the above abnormal waveform is not corrected, it will cause a false reading. In the present invention, a set of predetermined ideal reference waveforms, each of which corresponds to a character, are pre-stored; when the peak interval (distance) value is smaller or larger than the reference value, pattern matching is performed between each of the peak interval (distance) values constituting one character and the reference waveforms to determine the character on the basis of the similarity therebetween. About Pattern matching, the operation will be described below.

Template, matcher, data identifying means, etc. are functional parts of pattern matching, which may be performed by CPU or micro computer illustrated in FIG. 1. In the template, a set of predetermined ideal reference waveforms, each of which corresponds to each of sixteen kinds of character codes, are pre-stored. In the matcher, segment data contained in a buffer is compared to each of the reference waveforms pre-stored in the template by pattern matching using correlation coefficient. In the data identifying means, the correlation coefficient is identified, and the character code which corresponds to the greatest correlation coefficient is assigned to the segment as the reproduced data.

Figure 20:
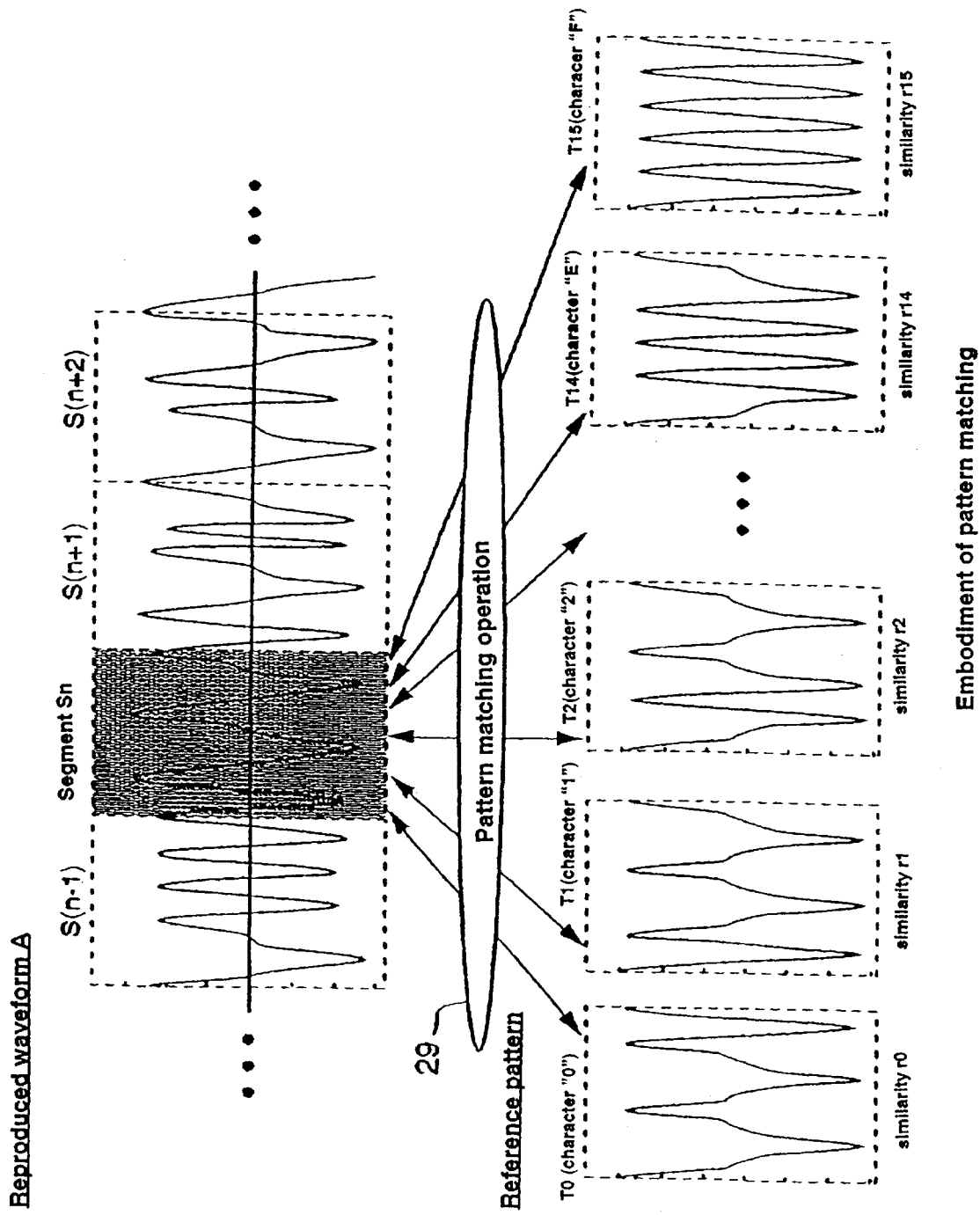
FIG. 20 is a waveform diagram showing an example of pattern matching that can be applied to the present invention.

Pattern matching will be described in more detail. A reproduced signal waveform A as illustrated in FIG. 20 is divided by five bits starting at a peak point by the aforementioned segmentation, and a portion of the reproduced signal waveform A for one character is picked out as a segment "Sn". Next, the segment "Sn" is compared to each of the reference waveform patterns "T0~T15" which are expressed by the sixteen kinds of the reference waveforms and pre-stored in the template. By pattern matching between the segment "Sn" and each of the sixteen kinds of the reference waveform patterns "T0~T15", correlation coefficients are calculated. The correlation coefficient is calculated in the following equation.

$$rk = \frac{\sum (Sn_i - Sn_m)(Tk_i - Tk_m)}{\left[\sum (Sn_i - Sn_m)^2\right]^{1/2}\left[\sum (Tk_i - Tk_m)^2\right]^{1/2}}$$

where k=0~15
Sn=($Sn_1$ ... $Sn_n$)
Tk=($Tk_1$ ... $Tk_n$)
$Sn_m$, $Tk_m$ respectively represent the averages of $Sn_1$ and $Tk_1$
−1.0≦rk≦1.0

After that, the greatest correlation coefficient "rm" is found among the calculated correlation coefficients. When the polarity of the starting peak point of the segment "Sn" differs from that of the starting peak point of the reference waveform pattern to which the target segment "Sn" is compared, the greatest correlation coefficient "rm" may possibly be a negative value. Therefore, the absolute value of the greatest correlation coefficient is used for similarity. Then, the character corresponding to the reference waveform, from which the greatest correlation coefficient "rm" is obtained, is allocated to the segment "Sn". Pattern matching is performed in the above manner and the similarity can be expressed by correlation coefficient.

FIG. 19 shows a correlation coefficient obtained by pattern matching for each segment in the reproduced waveform shown in FIG. 18. As seen in the result, the highest correlation coefficient "0.888" is obtained with respect to the character "01H". Returning to FIG. 2, the character obtained by the result of the aforementioned bit conversion is compared with the character obtained by pattern matching to determine if they are identical. The character obtained by pattern matching to determine if they are identical. The character obtained by pattern matching is "01H" and the character obtained by the result of bit conversion is "07H", thus they are different. Also, since the correlation coefficient is more than 0.8, the result of pattern matching is preferably adopted in S210. Thus, the character for the segment is determined as "01H".

According to the above mentioned embodiment, a time interval is measured between adjacent peaks of the reproduced signal; each of the peak interval values constituting one character is compared with the reference value to convert the signal waveform into a bit line of binary data to demodulate the data corresponding to one character; if the peak interval value is smaller or greater than the reference value, it is determined that the waveform contains an abnormal portion, and pattern matching is performed between each of the peak interval values constituting one character with the reference waveform data to determine the character on the basis of the similarity therebetween. Therefore, even when the waveform contains an abnormal portion that cannot be judged by only bit conversion, reliability of data demodulation can be further increased.

Also, the reference value to which each of the peak interval values constituting one character is set to have a certain range on the basis of an ideal peak interval value; when the peak interval value is smaller or greater than the reference value, it is detected that the waveform contains an abnormal portion; the abnormal waveform is corrected according to the characteristic condition of parity bit to determine the character; this character is compared to the character obtained by pattern matching; when these two characters differ from one another, the character obtained by pattern matching is preferably selected if the similarity provided by pattern matching is more than a predetermined degree, thus reliability of data demodulation can be further increased.

Figure 21:
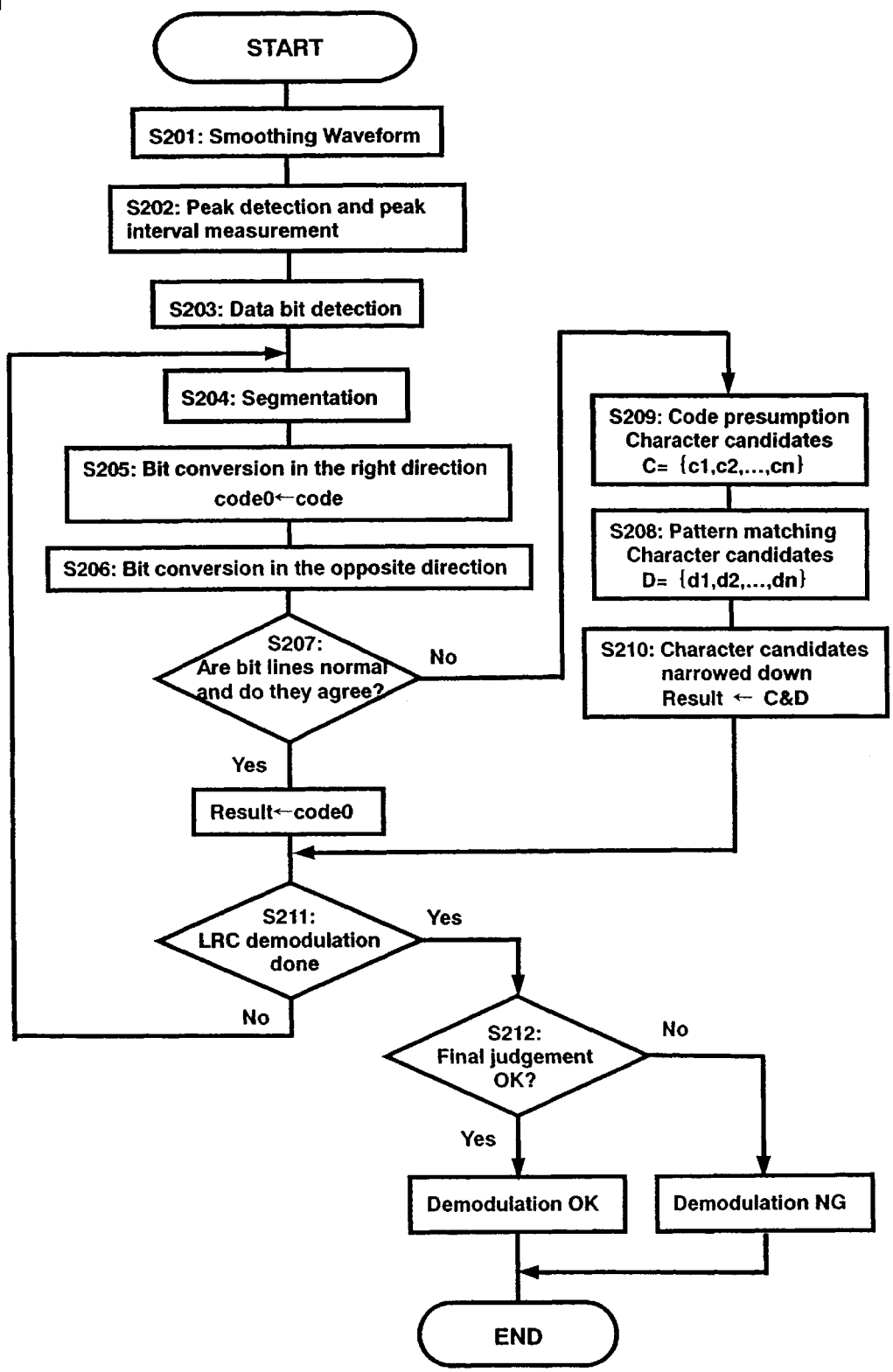
FIG. 21 is a flowchart showing another embodiment of the data demodulating method of the present invention.

In the above embodiment, the signal obtained by reading the recording medium is converted in one direction to obtain a bit line. However, a bit conversion may be performed in both directions to obtain bit lines. Then, even if the reproduced waveform is as illustrated in FIG. 21, a correct bit line can be obtained. This form of the embodiment will be described hereinafter. The configuration of the hardware (as the card reader) remains the same as the example of FIG. 1.

FIG. 21 shows a demodulating operation of this embodiment. Waveform smoothening in S201, peak detection and peak interval (distance) measurement in S202, data bit detection in S203, segmentation in S204, and bit conversion in S205 are performed in the same manner as the embodiment as in FIG. 2. Note that the bit conversion in S205 is in the right direction, but the bit conversion in S206 is performed in the opposite direction, that is, the reproduced waveform is converted to the bits from the opposite direction. The bit conversion of the right direction in S205 is performed such that the conversion proceeds in the direction the line number increases, starting with the first element of the peak interval (distance) data line that constitutes the segment for one character and ending with the last element. The bit conversion of the opposite direction in S206 is performed such that the conversion proceeds in the direction the line number decreases, starting with the last element of the peak interval (distance) data line that constitutes the segment for one character and ending with the first element. The segmentation in S204 is performed in the same manner as one illustrated in FIG. 6.

When the results of the bit conversions in the right and opposite directions (sequences) agree with one another, either one of the results is adopted. When the results of bit conversions in the right and opposite directions disagree, it means that the waveform contains an abnormal portion. Therefore, sub-possibilities C={c1, c2 ... , cn} are created in S209, followed by pattern matching in S208 in which four possible character candidates having the first four greatest correlation coefficients are selected to create character candidates D={d1, d2, ... , dn}. Next, the character candidates are reduced in S210. Here, an intersection of C and D, E=C∩D is obtained as a decoding result of the segment.

Figures 22, 23:
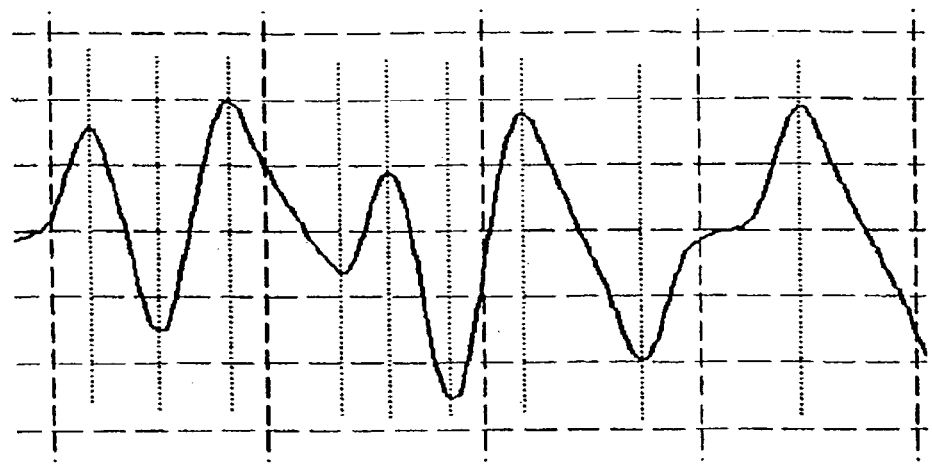
FIG. 22 is a waveform diagram showing a waveform which the above embodiment can process correctly but a conventional data demodulating method causes a false reading.
FIG. 23 is a diagram showing a correlation between the bit conversion and the demodulation by pattern matching of the above embodiment.

The above steps are described in detail by referring to an example of FIG. 22 and FIG. 23. The waveform of a segment illustrated in FIG. 22 contains an abnormal portion, and the peak interval value line thereof is given at the bottom of the figure. If this waveform is converted in the right direction by bit conversion, a bit line "10110" is obtained; if converted in the opposite sequence, a bit line "11100" is obtained. Since these two bit lines disagree, it is detected that the waveform contains an abnormal portion. The characters that can be expressed by the two bit lines are "01H", "07H", "0BH", and "0DH". C={"01H", "07H", "0BH", "0DH"} are obtained as a set of character candidates (S209). Next pattern matching is performed and sixteen correlation coefficients are obtained with respect to the sixteen characters as shown in FIG. 23. Therefore, the first four greatest correlation coefficients are selected to create a reduced set of character candidates D={"07H", "01H", "1FH", "04H"}. Accordingly, the intersection of C and D, E equals C∩D={"017H", "07H"}. The two character candidates {"017H", "07H} are taken as the decoding result for this segment.

According to the above described embodiment, two kinds of bit lines are obtained by operating the bit conversion in the right and opposite directions (sequences), and the normality of the segment is determined depending on the agreement between the two bit lines; therefore, it can be determined if the segment is normal and an abnormal waveform which was previously overlooked from the bit line obtained by the bit conversion in the single sequence can be now read by presumption. Thus, the data demodulation performance can be improved greatly. Further, an abnormal waveform can be detected by the bit conversions performed in the right and opposite sequences; when the character cannot be determined, the character candidates obtained by the demodulation on the basis of each bit line are compared with the corresponding characters obtained by pattern matching, and the character on which the comparison agrees is determined as the character. Therefore, reliability of data demodulation can be further increased.

Next, another embodiment illustrated in FIG. 24 is described. In FIG. 24, a magnetic card reading apparatus, that is, a card reader 30 comprises the constituents described in FIG. 1, i.e., magnetic head 21, amplifier 22, A/D converter 23, buffer memory 24, CPU 25, and transporting roller 26. The card reader 30 also comprises a waveform data transmitter 27 which transmits digital waveform data obtained in the card reader 30 to a host controller 40. The host controller 40 has CPU 32 and RAM 33 built in or attached to CPU 32. RAM 33 comprises waveform pretreatment means 34, peak interval measurement means 35, and character identifier 36. These functional blocks constitute data demodulating means such as peak interval measurement, segmentation, bit conversion, and pattern matching. The functional blocks are provided in a form of dynamic link library or device driver.

In the embodiment as configured in FIG. 24, CPU 25 in the card reader controls an A/D conversion to obtain digital waveform data, a measurement of a time interval between adjacent peaks of the digitized reproduced signal, and a to storage of a peak interval value line in the buffer memory 24; then, the digital waveform data is sent to the host controller 40. The host controller 40 uses the functional subsystems to operate successive demodulation steps. In other words, it determines the end of the character by adding each of the peak interval values from the peak interval value line, compares each of the peak interval values that constitute one character with the reference value to convert the signal waveform in a bit line of binary data, and performs pattern matching and various kinds of controls accompanying the above.

The apparatus needs to provide a considerably large capacity to perform the above mentioned operations because each of the peak interval values from the peak interval value line is added successively to determine the end of one character and each of the peak interval values that constitute one character is compared to the reference value to convert the signal waveform to a bit line of binary data, and pattern matching. The capacity may be insufficient if these operations are performed only in a card reader. However, according to the embodiment illustrated in FIG. 24, the demodulation can be operated in the host controller of the card reader; therefore, there is no need to increase the process capacity of the card reader, but the process capacity in the overall process system can be optimized.

Resume Of The Third Embodiment

According to the present invention, a time interval between adjacent peaks of the produced signal is measured and each of the peak interval values that constitute one character is compared to a reference value to convert the signal waveform to a bit line of binary data to demodulate the data for one character; when the peak interval value is smaller or greater than the reference value, it is determined the waveform contains an abnormal portion, and pattern matching is performed between each of the peak interval values that constitute one character and the reference waveform data patterns to determine the corresponding character based on the similarity therebetween. Therefore, even if the waveform contains an abnormal portion that cannot be determined correctly only by a bit conversion, the character can correctly determined, thus increasing reliability of data demodulation.

According to the present invention, the reference value is set to have a certain range on the basis of an ideal peak interval value; when the peak interval value is smaller or greater than the reference value, it is detected that the waveform contains an abnormal portion; and the abnormal portion is corrected according to the characteristic condition of parity bit to determine the corresponding character. Therefore, the abnormal waveform can accurately be detected and corrected. In addition, the corresponding character is compared to the character obtained by pattern matching; if the two characters disagree with one another, when the similarity by pattern matching is of more than a predetermined degree, the character obtained by pattern matching is selected. In this manner, reliability of data demodulation can be further increased.

According to the present invention, each of the peak interval values that constitute one character is compared to the reference value in the right and opposite directions to obtain two kinds of bit lines; when the two bit lines disagree with one another, each of the bit lines is demodulated to provide character candidates; these character candidates are compared to the corresponding characters obtained by pattern matching; the character agreeing in comparison is determined as the character. Therefore, accuracy of data demodulation can be further increased, thus further increasing reliability thereof.

According to the present invention, a reproduced signal waveform is converted to a digital signal by A/D conversion; a time interval between adjacent peaks of the digitized reproduced signal is measured to create a peak interval value line; each of the peak interval values from the peak interval value line is successively added to determine the end of one character; and each of the peak interval values that constitute one character is compared to the reference value to convert the signal waveform in a bit line of binary data, and the bit line is considered as the data of one character. Therefore, accuracy of the data demodulation from the peak interval value line can be increased.

According to the present invention, demodulation can be operated in the host controller of the card reader; therefore, there is no need to increase the process capacity of the card reader, but the process capacity of the overall process system can be optimized.

What is claimed is:

1. A data demodulating method in which binary data are defined by a pulse code modulated signal composed of a combination of a high and a low frequency signals, data for one character are produced with a predetermined number of bits of said binary data and a parity bit, said binary data is demodulated by detecting whether or not a peak point exists within a predetermined time interval distance in a reproduced signal waveform obtained by reproducing a recorded data signal, comprising steps of:
    defining a character time interval distance for one character of said recorded data as a predetermined range by a predetermined number of bits;
    converting said reproduced signal waveform to digital data by A/D conversion;
    detecting all the peaks in said digitized reproduced signal waveform and measuring a time interval distance between said peaks to create peak interval distance values;
    adding each of said peak interval distance values successively;
    and determining the end of one character with a peak position in said character time interval distance for one character to demodulate the data for one character.

2. The data demodulating method as set forth in claim 1 wherein: it is determined if the number of said peak interval distance values within said character time interval distance satisfies the condition of said parity bit; if the condition is not satisfied, the next peak interval distance value is added to determine the end of one character.

3. The data demodulating method as set forth in claim 1 wherein: said parity bit is an odd parity, and it is determined if the number of said peak interval distance values within said character time interval distance satisfies the condition of said parity bit; and
    if the condition is not satisfied, the next peak interval distance value is added to determine the end of one character.

4. The data demodulating method as set forth in claim 1 wherein said character time interval distance for one character is set based on the number of the total length of reference bit cell lengths for one character.

5. A data demodulating method in which binary data are defined by a frequency modulated signal composed of a combination of high and low frequency signals, data for one character are produced with a predetermined number of bits of said binary data and a parity bit, peak points are detected in a reproduced signal waveform by reproducing a recorded data signal, on the basis of periods of said low frequency signal, to demodulate said binary data, comprising steps of:
    converting said reproduced signal waveform to digital data by A/D conversion;
    measuring a time interval distance between peaks of said digitized reproduced signal waveform to create a peak interval distance value line;
    determining the end of one character by successively adding each of said peak interval distance values from said peak interval distance value line;
    comparing each of said peak interval distance values that constitute one character with a reference value to convert the signal waveform to a bit line of binary data to demodulate the data for one character;
    wherein: each of said peak interval distance values from a peak interval distance value data line is added successively to determine the end of one character;
    each of said peak interval distance values which constitute one character is compared to said reference value in the right and opposite directions of said data line sequence to obtain two kinds of bit lines; and
    based on said two bit lines, the data for one character are demodulated.

6. The data demodulating method as set forth in claim 5 wherein:
    said reference value is set to have a certain range based on an ideal distance value;
    it is detected that there is an abnormal waveform when said peak interval distance value is smaller or greater than said reference value;
    and said abnormal waveform is corrected according to the characteristic condition of parity bit to demodulate the data for one character.

7. The data demodulating method as set forth in claim 5 wherein: said reference value is set to have a certain range based on an ideal distance value; and
    when said peak interval distance value is smaller or greater than said reference value, each of said peak interval distance values which constitute one character is compared to said reference value in the right and opposite directions of said data line sequence.

8. The data demodulating method as set forth in claim 7 wherein: when said bit line obtained by comparison in the right direction disagrees with that obtained by comparison in the opposite direction, the different portion is corrected according to the characteristic condition of parity bit.

9. The data demodulating method as set forth in claim 6 wherein: a character time interval (distance) for one character of said recorded data is defined as a predetermined range by a predetermined number of bits;

the end of one character is determined with a peak position within said time interval distance for one character;

it is detected whether or not the number of the peak interval distance values up to said peak position within said time interval distance satisfies the characteristic condition of parity; and if the condition is not satisfied, the next peak interval distance value is further added to determine the end of one character.

10. The data demodulating method as set forth in claim 6 wherein: said parity bit is an odd parity;

it is detected whether or not the number of the peak interval distance values up to a peak position within a character time interval distance;

if the number is odd, the next peak interval distance value is further added to determine the end of one character.

11. A data demodulating method in which binary data are defined by a pulse code modulated signal composed of a combination of a high and a low frequencies, data for one character are produced with a predetermined number of bits of said binary data and a parity, and peak points are detected in a reproduced signal waveform obtained by reproducing a recorded data signal to demodulate said binary data, comprising steps of:

converting said reproduced signal waveform into a digital signal by A/D conversion;

measuring a time interval between each peaks of said digitized to reproduced signal;

comparing each of said peak interval values that constitute one character to a reference value to convert said signal waveform to a bit line of binary data to demodulate said data for one character;

preparing in advance a set of ideal reference waveform data, each of which corresponds to a character;

when said peak interval value is smaller or greater than said reference value, pattern matching is performed between each of said peak interval values that constitute one character and said reference waveform data to determine the character, based on the similarity therebetween.

12. The data demodulating method as set forth in claim 11 wherein:

said reference value is set to have a certain range based on an ideal peak interval value;

when the peak interval value is smaller or greater than said reference value, it is detected that the waveform contains an abnormal portion;

said abnormal waveform is corrected according to the characteristic condition of parity bit to determine the corresponding character;

said corresponding character is compared to the character obtained by pattern matching; and if said two characters differ from one another, when the similarity by pattern matching is more than a predetermined degree, said character obtained by pattern matching is selected as the character expressed by said data.

13. The data demodulating method as set forth in claim 11 wherein: each of said peak interval values that constitute one character is compared to said reference value in right and opposite directions to obtain two bit lines;

when said two bit lines disagree with one another, the signal waveform is demodulated based on each of said bit lines to obtain character candidates;

said character candidates are compared to the character obtained by pattern matching to determine the character agreeing in comparison as the character expressed by said data.

14. The data demodulating method as set forth in claim 11 wherein: said reproduced signal waveform is converted to a digital signal by A/D conversion;

a time interval between peaks of said digitized reproduced signal is measured to create a peak interval value line;

each of said peak interval values from said peak interval value line is successively added to determine the end of one character;

each of said peak interval values that constitute one character is compared to said reference value to convert the signal waveform to a bit line of binary data which is taken as the data for one character.

15. The data demodulating method as set forth in claim 14 wherein:

said reproduced signal waveform is converted to a digital signal by A/D conversion;

a time interval between peaks of said digitized reproduced signal is measured to create a peak interval value line;

said peak interval value line is stored in memory in a card reader;

said data stored in said memory is transmitted to a host apparatus that controls said card reader, in which each of said peak interval values from said peak interval value line is successively added to determine the end of one to character, and each of said peak interval values that constitute one character is compared to said reference value to convert said signal waveform to a bit line of binary data.

16. Apparatus for demodulating data in which each character of the data are encoded by a predetermined number of binary bits and in which pulse code modulation is used for bit identification comprising:

a detection and amplifying means coupled to said recorded data to provide an analog signal waveform, an A/D converter coupled to said analog signal waveform to provide a digitized signal waveform for each character, a timing detection means coupled to said digitized waveform to detect the peaks in said digitized signal waveform and to measure the time interval between each peak of said digitized signal to provide a set of peak interval values for each character, a set of ideal reference waveform data in memory, each of said ideal waveform data corresponding to a predetermined character, and a comparator coupled to each of said set of peak interval values and to said set of ideal reference waveforms to compare by pattern matching means each of said set of peak interval values with each of said reference waveform data to determine the character involved based on pattern matching similarity.

17. A data demodulating method in which binary data are defined by a frequency modulated signal composed of a combination of high and low frequency signals, data for one character are produced with a predetermined number of bits of said binary data and a parity bit, peak points are detected in a reproduced signal waveform by reproducing a recorded data signal, on the basis of periods of said low frequency signal, to demodulate said binary data, comprising steps of:

converting said reproduced signal waveform to digital data by A/D conversion;

measuring a time interval distance between peaks of said digitized reproduced signal waveform to create a peak interval distance value line;

determining the end of one character by successively adding each of said peak interval distance values from said peak interval distance value line;

comparing each of said peak interval distance values that constitute one character with a reference value to convert the signal waveform to a bit line of binary data to demodulate the data for one character;

obtaining the binary data for one bit from one peak interval distance value in said peak interval distance value data line;

subtracting said one peak interval distance value from the peak interval distance value total for one character; and determining the next reference value from the remaining peak interval distance value total and the number of unprocessed bits.

* * * * *